(12) United States Patent
Becker et al.

(10) Patent No.: US 11,206,755 B2
(45) Date of Patent: Dec. 28, 2021

(54) HINGE ASSEMBLY FOR WING FRAME SECTIONS OF AGRICULTURAL IMPLEMENT

(71) Applicant: DEERE & COMPANY, Moline, IL (US)

(72) Inventors: Shawn J. Becker, Centralia, KS (US); Andrew J. Peterson, Ankeny, IA (US); Mark D. Beeck, Ankeny, IA (US); Jarrod R. Ruckle, Bondurant, IA (US)

(73) Assignee: DEERE & COMPANY, Moline, IL (US)

(*) Notice: Subject to any disclaimer, the term of this patent is extended or adjusted under 35 U.S.C. 154(b) by 426 days.

(21) Appl. No.: 16/406,402

(22) Filed: May 8, 2019

(65) Prior Publication Data

US 2020/0053951 A1 Feb. 20, 2020

Related U.S. Application Data

(60) Provisional application No. 62/764,822, filed on Aug. 15, 2018.

(51) Int. Cl.
*A01B 73/04* (2006.01)
*F16C 11/04* (2006.01)

(52) U.S. Cl.
CPC ............ *A01B 73/044* (2013.01); *F16C 11/04* (2013.01); *A01B 73/046* (2013.01)

(58) Field of Classification Search
CPC ...... A01B 73/044; A01B 73/046; F16C 11/04
See application file for complete search history.

(56) References Cited

U.S. PATENT DOCUMENTS

| | | | |
|---|---|---|---|
| 6,213,219 B1 * | 4/2001 | Mosdal et al. ....... | A01B 73/044 172/311 |
| 8,468,655 B2 | 6/2013 | Borkgren et al. | |
| 10,798,868 B2 * | 10/2020 | Limaye et al. ...... | A01B 73/044 |
| 2007/0169950 A1 * | 7/2007 | Grieshop ............... | A01B 63/22 172/311 |

\* cited by examiner

*Primary Examiner* — Tara Mayo-Pinnock
(74) *Attorney, Agent, or Firm* — Klintworth & Rozenblat IP LLP

(57) ABSTRACT

A hinge assembly for an agricultural implement having inner and outer wing frame sections has an inner pivot bracket pivotally coupled to the inner wing frame section at a fold pivot location, and an outer pivot bracket pivotally coupled to the outer wing frame section at a flex pivot location and coupled to the inner pivot bracket. An inner pivot link pivotally couples to the inner pivot bracket and the outer pivot bracket, and an outer pivot link pivotally couples to the outer pivot bracket and the outer wing frame section. The inner and outer pivot brackets pivot relative to each other at the fold pivot location between a working state and a folded state, and the flex pivot location moves relative to the fold pivot location during the relative pivoting. When in the working state, the fold pivot location is higher than a top side of the inner wing frame section and the flex pivot location is lower than a bottom side of the inner wing frame section.

20 Claims, 21 Drawing Sheets

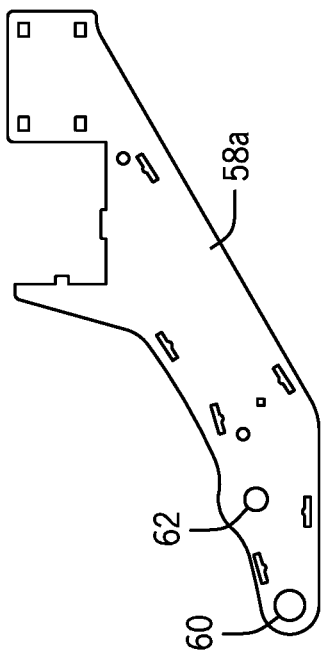
FIG. 8
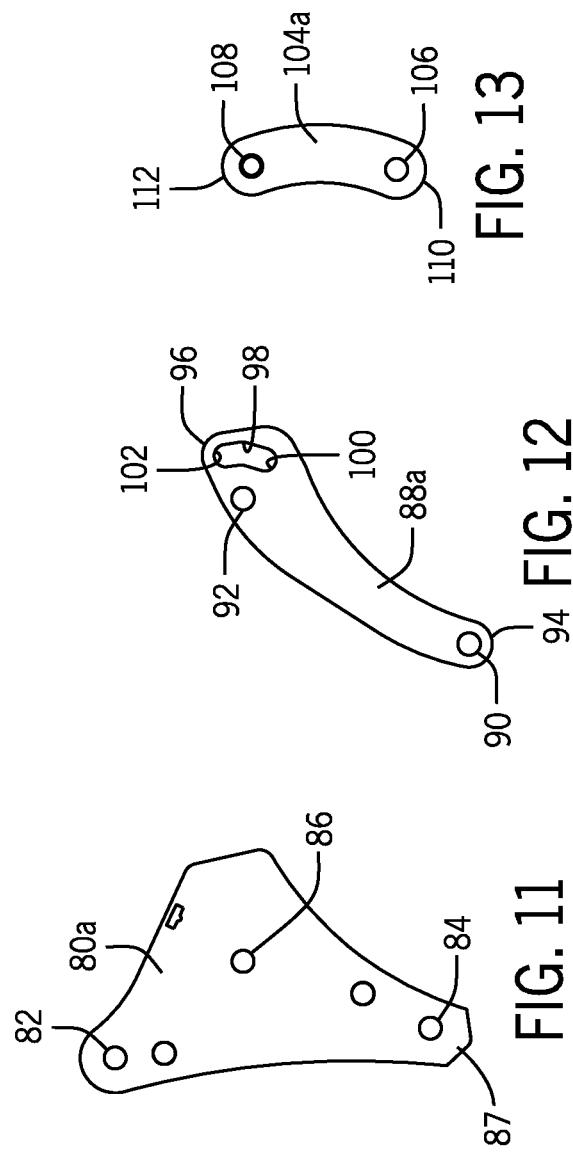
FIG. 9
FIG. 13
FIG. 12
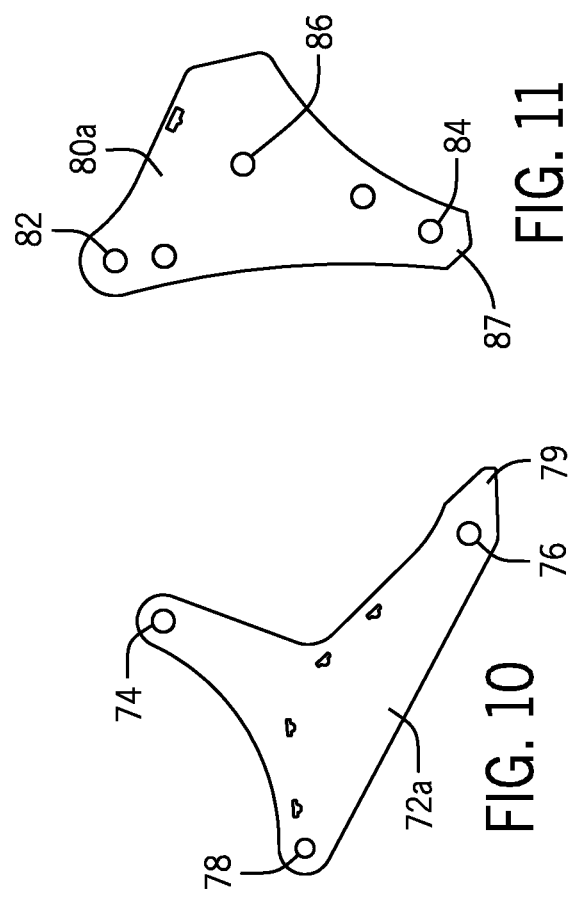
FIG. 11
FIG. 10

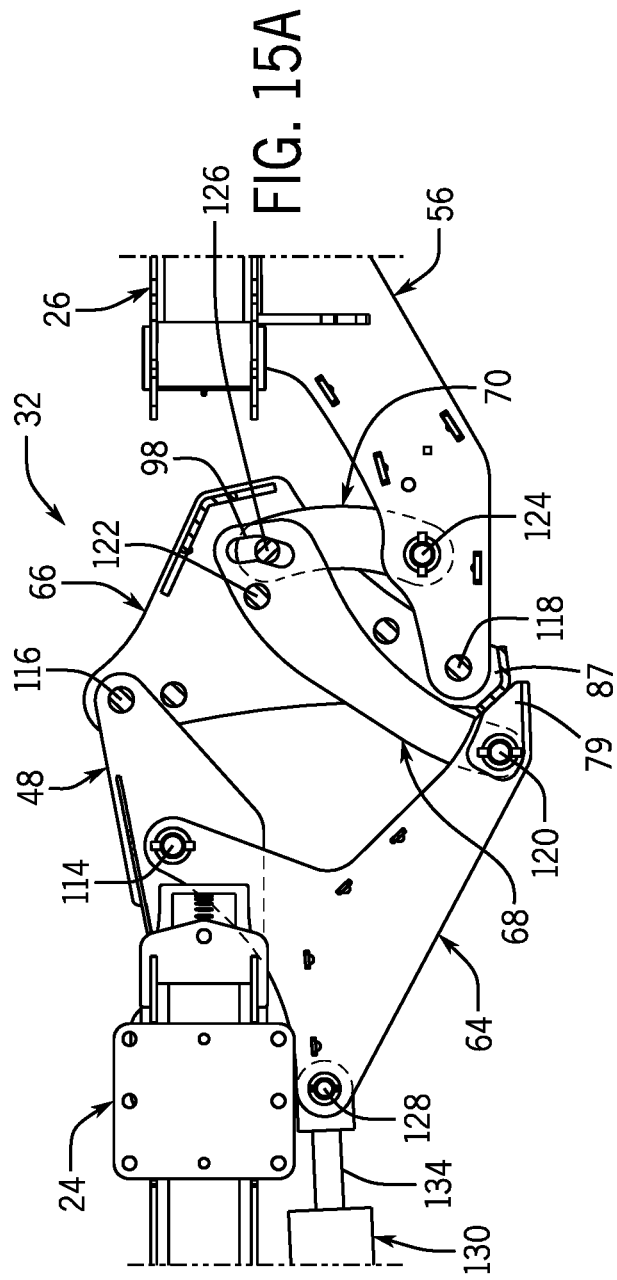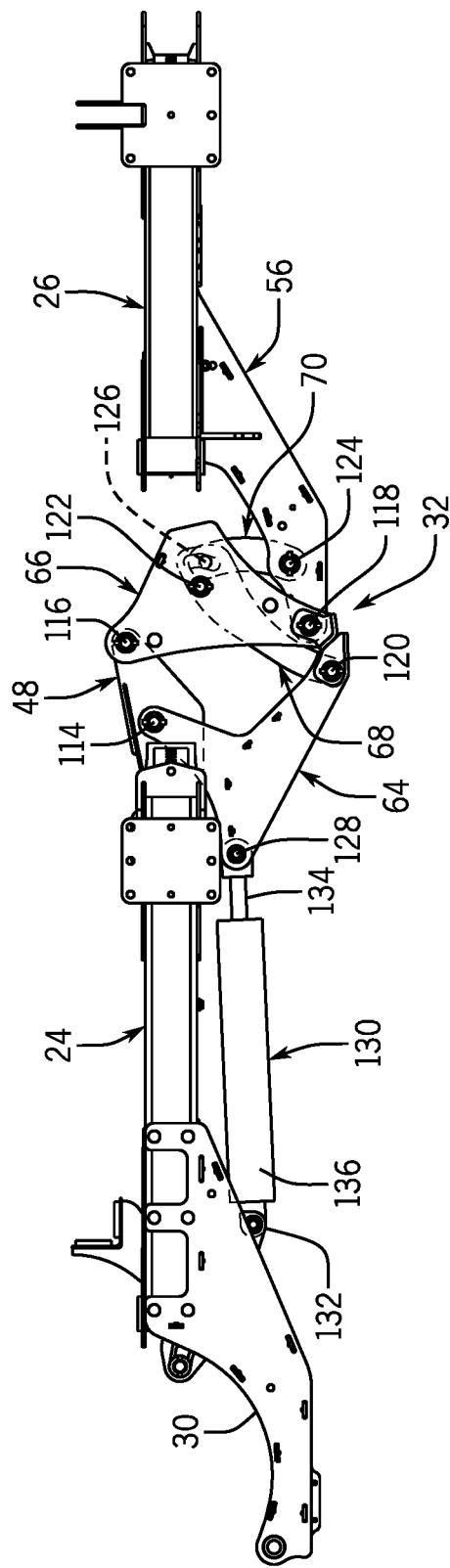

HINGE ASSEMBLY FOR WING FRAME SECTIONS OF AGRICULTURAL IMPLEMENT

CROSS-REFERENCE TO RELATED APPLICATION(S)

This application claims priority to U.S. Provisional Application 62/764,822, which was filed on Aug. 15, 2018.

STATEMENT OF FEDERALLY SPONSORED RESEARCH OR DEVELOPMENT

Not applicable.

FIELD OF THE DISCLOSURE

This disclosure relates to a hinge assembly defining multiple pivot axes, and in particular, to a hinge assembly used in a frame of an agricultural implement.

BACKGROUND OF THE DISCLOSURE

Various agricultural implements, such as large-scale tillage, spraying and seeding implements, span wide distances using multi-section frames, such as having inner and outer wing frame sections that are pivotally attached to a main or center frame section in a manner that enables the inner and outer wing frame sections to be stowed for transport and unfolded during working of the ground or crop. Powered hinge assemblies between the wing frame sections enable the wing frame sections to be extended and retracted by the operator in the cab of a towing vehicle.

SUMMARY OF THE DISCLOSURE

The disclosure provides a hinge assembly joining wing frame sections of an agricultural implement in which multiple pivot points enable different pivot axes or centers of rotation for the relative pivoting of the wing frame sections while in a working state and when folding into or unfolding from a stowed or transport state.

In one aspect, the disclosure provides a hinge assembly for an agricultural implement having an inner wing frame section and an outer wing frame section. The hinge assembly includes an inner pivot bracket pivotally coupled to the inner wing frame section, an outer pivot bracket pivotally coupled to the inner pivot bracket at a fold pivot location and pivotally coupled to the outer wing frame section at a flex pivot location, an inner pivot link pivotally coupled to the inner pivot bracket and the outer pivot bracket, and an outer pivot link pivotally coupled to the outer pivot bracket and the outer wing frame section. The inner pivot bracket and the outer pivot bracket pivot relative to each other at the fold pivot location between a working state and a folded state, and the flex pivot location moves relative to the fold pivot location during the relative pivoting of the inner pivot bracket and the outer pivot bracket. When in the working state, the fold pivot location is higher than the top side of the inner wing frame section and the flex pivot location is lower than the bottom side of the inner wing frame section.

In another aspect, the disclosure provides an agricultural implement having an inner wing frame section with top and bottom sides, an outer wing frame section with top and bottom sides, and a hinge assembly pivotally coupling the inner wing frame section and the outer wing frame section. The hinge assembly includes an inner pivot bracket pivotally coupled to the inner wing frame section, an outer pivot bracket pivotally coupled to the inner pivot bracket at a fold location and pivotally coupled to the outer wing frame section at a flex pivot location, an inner pivot link pivotally coupled to the inner pivot bracket and the outer pivot bracket, and an outer pivot link pivotally coupled to the outer pivot bracket and the outer wing frame section. The inner pivot bracket and the outer pivot bracket pivot relative to each other at the fold pivot location between a working state and a folded state, and the flex pivot location moves relative to the fold pivot location during the relative pivoting of the inner pivot bracket and the outer pivot bracket. When in the working state, the fold pivot location is higher than the top side of the inner wing frame section and the flex pivot location is lower than the bottom side of the inner wing frame section The details of one or more embodiments are set forth in the accompanying drawings and the description below. Other features and advantages will become apparent from the description, the drawings, and the claims.

BRIEF DESCRIPTION OF THE DRAWINGS

FIGS. 8-13 are plan views of certain components associated with the hinge assembly of FIG. 6;

FIG. 14 is an enlarged partial cross-section views of the hinge assembly and portions of the inner and outer wing frame sections in the fully extended working state;

FIGS. 15A-15F are enlarged partial cross-section views of the hinge assembly and portions of the inner and outer wing frame sections shown various states;

Like reference symbols in the various drawings indicate like elements.

DETAILED DESCRIPTION

Figure 1:
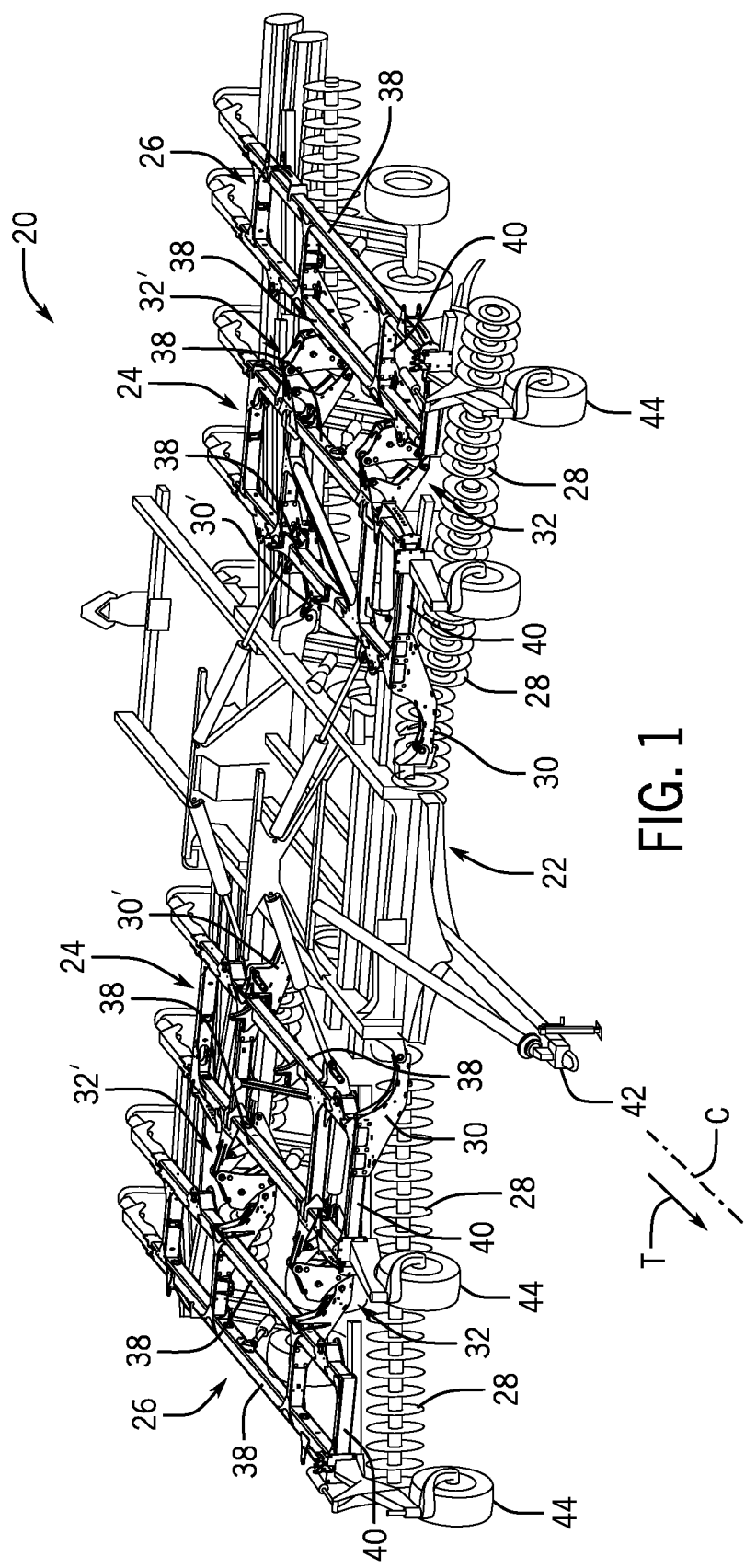
FIG. 1 is a perspective view of an example agricultural implement in the form of a tillage implement in which this disclosure may be incorporated.

The following describes one or more example embodiments of a disclosed agricultural implement and double hinge assembly, as shown in the accompanying figures of the drawings described briefly above. Various modifications to the example embodiments may be contemplated by one of skill in the art.

The disclosure is presented and discussed at times with respect to a specific agricultural implement, including the example vertical tillage implement shown in the drawings. It should be understood that, as applicable, the principles of the disclosure may apply to either of the illustrated examples as well as to other agricultural implements, such as sprayers, seeders and other large tillage implements. Thus, the disclosure should not be limited to the specific examples described below and shown in the accompanying figures of the drawings.

Also, terms of direction and orientation will be used herein with respect to one or more of a direction of travel and the ground. For example, the terms "forward" and "fore" (and variants) refer to a direction corresponding to the direction of travel of the agricultural implement, while the terms "rearward" and "aft" (and variants) refer to a direction opposite the direction of travel. The terms "fore-aft" and "fore-aft axis" are also utilized in reference to a direction or an axis extending in the fore and aft directions. By comparison, the terms "lateral" or "lateral axis" refer to a direction or an axis that is perpendicular to the fore-aft axis and extends in a horizontal plane. Also, the terms "vertical" or "vertical axis" refer to a direction or an axis that is orthogonal to a horizontal plane. Reference to components being vertically higher or lower is made in the context of the component being mounted to an assembly on level ground. The terms "up" and "down" (and variants) refer to a vertical relation to the ground. The terms "inner" or "inside" and "outer" or "outside" (and variants) are terms of relative relation to a fore-aft centerline of the agricultural implement in which an "inner" object is nearer the centerline than an "outer" object.

In large-scale agricultural implements, possibly self-propelled but more typically pulled by a towing vehicle (e.g., an agricultural tractor), covering a wide span or swathe of ground (e.g., 40, 80 or 100 feet or more), a tool carrying framework may be divided into sections (e.g., three or five) that may fold and unfold relative to one another to allow the agricultural implement to take a more compact configuration suitable for transport on roadways or for storage, while still providing the wide coverage in a field. The movable sections may be referred to as wings or wing frame sections. Inner wing frame sections pivotally couple to one or more main or center frame sections and also pivotally couple to one or more outer wing frame sections. To accommodate the large span of field and compact storage or transport, such agricultural implements carry numerous discrete ground-working tools arranged in a suitable array to work the ground across the entire span. The type and quantity of tools will depend upon the type and span of the agricultural implement. For example, a vertical tillage implement may have multiple gangs of rotating disks, in which the gangs of disks are spaced apart laterally (generally perpendicular to the direction of travel) within the gangs, and the multiple gangs are arranged laterally across each frame section, such that the agricultural implement will work the ground across the entire span of the agricultural implement. The agricultural implement may have multiple rows of disk gangs and/or may have other secondary operation tools, such as various harrows, rakes and baskets and so on. As another example, planting machines or "seeders" may have numbers row units arranged laterally across the agricultural implement for trenching the ground and delivering seed to the ground. The wing frame sections may also be in the form of booms, such as is used in large-scale sprayers that carry numerous spray nozzles (and associated plumbing) arranged laterally across the boom sections to deliver (typically liquid) media (e.g., nutrients, fertilizer, pesticides, etc.) to the ground. In the case of tillage and seeding implements, the wing frame sections may also carry ground-engaging wheels to support the wing frame sections when in one or more working states. Pneumatic and hydraulic cylinders may be used to actuate the tools as well as to actuate the pivotal movement of the wing frame sections. These actuators require runs of plumbing lines and manifolds to serve each individual actuator. Sensors may be used to give the operator or automated control unit on the towing vehicle feedback and control of the position of the various tools and the wing frame sections. The sensors typically are hardwired and require long runs of wires and wire harnesses. Thus, in all, such large-scale agricultural implements are heavily-laden machines with numerous differently-configured tools, which makes stowing the wing frame sections challenging.

Another aspect of these large-scale agricultural implements is the ability to accommodate for changes in ground contour as the agricultural implement traverses the ground. Contour fluctuations requiring changes in pitch (fore-aft slope) and yaw (level angular adjustments) may be accommodated largely by the interface of the agricultural implement with the towing vehicle (e.g., hitch assembly). Lateral contour changes causing the roll movement may also be accommodated to some extent by the hitch. However, given the widths of these agricultural implements, such roll movement may be limited or challenging. To improve the lateral ground-following capabilities of the agricultural implement, the wing frame sections (under power or by allowing the associated hydraulics to float) may be configured to "flex" or pivot upwardly and/or downwardly relative to one another and relative to the main or center frame section while working the ground. This requires that the hinge assemblies coupling the wing frame sections to accommodate pivoting for both working of the ground and the unfolding/folding for stowing. Providing suitable pivotal motion, particularly in the heavy-duty context of large-scale agricultural implements, may be challenging for various reasons. In some cases, multiple hinge assemblies may be needed to provide separate hinge points for each pivotal motion (i.e., multiple hinge assembles to stow and flex the wing frame sections). Even if both motions may be achieved at a single hinge point, compromises in the folding or flexing may be required (e.g., the outer wing frame section may not fold over the inner wing frame section fully (i.e., 180 degrees) or the degree of flex may be more limited than desired). In either case, the hinge assemblies may not provide a consistent spacing of adjacent tools (e.g., disks) between the inner and outer wing frame sections (as compared to intra-gang disk spacing) or sufficient spacing to or compact range of motion prevent unintended interference between adjacent tools during downward flexing.

Moreover, various tool arrangements may cause thrust loads across the hinge assemblies that may affect the flexing of the wing frame sections when working the ground in a manner that is detrimental to the performance of the agricultural implement. For example, front and rear rows of disk gangs may be arranged in canted or fore-aft angled orientations, such as with the front rows of disk gangs offset with their inner ends forward of their outer ends, and the rear rows of disk gangs in the opposite offset orientation with their inner ends rearward of their outer ends. The disks themselves may also or instead be canted within their respective gangs. Arranging the disk gangs in this way may serve to move the soil in different lateral directions at the front and rear rows of disk gangs, for example, to better break up the soil during a tillage operation. The offset disk gangs will thus impart different thrust forces on the wing frame sections and the coupling hinge assemblies, for example, toed in disks at the front will cause laterally inwardly directed thrust at the front of the agricultural implement and toed out disks at the rear will cause laterally outwardly directed thrust at the rear of the agricultural implement. If the front and rear thrust loads are not equal, which typically they are not given that the front disk gangs are first to break up the soil and thereby encounter more thrust than the rear disk gangs, an overall moment is effected on the front and rear hinge assemblies (in the case of two hinge assemblies between wing frame section pairs). Further, the vertical distance between each effective thrust load from the hinge line creates a moment on the associated hinge assembly. High thrust moments can adversely affect the agricultural implement by causing inefficiencies in the actuation system and/or resisting or impeding the range of flex during working conditions.

Thus, in various embodiments, this disclosure provides an agricultural implement, and hinge assembly therefor, which addresses the foregoing issues. The disclosed hinge assembly is understood to be of a sufficiently robust construction as to handle loads associated with moving tool-laden wing frame sections, which can weigh several tons in some cases. In one sense, the hinge assembly is a double-jointed or dual-acting hinge providing separate hinge points or centers of rotation for the folding/unfolding motion of the wing frame sections and for the upward/downward flexing of the wing frame sections encountered while working the ground. The hinge assembly may thus be thought of as a dual hinge providing both a fold or transport pivot or hinge and a flex or field pivot or hinge in a single assembly. The disclosed dual hinge also provides for the full range of motion typically desired in the context of agricultural implements. For example, the disclosed hinge assembly may allow for one wing frame section to fully fold on top of another wing frame section (e.g., at least 180 degrees of rotation) about the fold or transport pivot or hinge, while the flex or field pivot or hinge allows flexing of the wing frame section in the range of about 10-20 degrees (e.g., 10 degrees of down flex and 15 degrees of up flex). The disclosed hinge assembly should also be understood to be suitable for power-actuated folding and unfolding with a suitable construction to interface with and be actuated by a hydraulic cylinder.

In various forms, the disclosed hinge assembly may be configured so that the two pivot or hinge lines are different, and in particular, are at different vertical positions when the agricultural implement is level. Further, the disclosed hinge assembly may be configured such that the flex or field pivot or hinge is vertically lower than the fold or transport pivot or hinge when the agricultural implement is on level ground, and in particular, the fold or transport pivot or hinge may be above or higher than a top side of the wing frame sections and the flex or field pivot or hinge may be below or lower than a bottom side of the wing frame sections. The elevated fold or transport pivot or hinge may serve to facilitate full (i.e., at least 180 degree) folding of the wing frame section onto the center or other wing frame section to which it is coupled, and the flex or field pivot or hinge may serve to reduce the thrust moment on the hinge assembly and any associated adverse impact on operational performance (e.g., hampered flexing of the wing frame sections) as well as allow for an actuating cylinder to be positioned below the beams of the associated frame section (e.g., under the lateral beam of either an inner wing frame section or an outer wing frame section).

In various forms, the disclosed hinge assembly may be configured as a linkage, such as in the example arrangement detailed below. The linkage may be configured not only to provide the requisite pivotal motions for stowing and flexing, but may also be configured so that the linkage provides a supporting upwardly-acting reactive force tending to resist downward motion of the wing frame section being pivoted when at an over-center state (i.e., when the hinge assembly goes from pivoting the wing frame section upwardly to resisting downward movement) and after the over-center orientation as it is folded. Connecting links of the linkage may couple, such as at a pin and slot connection, so that links of the linkage are near a relative 90-degree angle at the over-center orientation and a suitable angle afterward that tends to reduce play in the hinge assembly and prevents freefall of the wing frame section during folding.

The disclosed hinge assembly may also be part of or operated by an actuation system that allows the hinge assemblies to operate independently mechanically (i.e., front and rear hinge assemblies between a common frame section pairing are not otherwise mechanically tied together), and the cylinders of one wing frame section pairing may be hydraulically locked during operation of the agricultural implement and isolated by suitable valving (e.g., a one-way check valve) from the rest of the hydraulic system to prevent cross-talk between cylinders during folding. An actuating cylinder associated with each hinge assembly may be configured with the piston retracted to lock the wing frame sections during operation of the agricultural implement at least in part to counteract any torque moment arising from any imbalance or twisting between the front and rear of the agricultural implement. The pistons may be retracted and locked when the wing frame sections are in the fully extended working state, as well as during upward and downward flexing when the in upward and downward flex working states.

Referring now to the drawings, an example embodiment is described with respect to the example agricultural implement 20 shown in FIG. 1. It will be understood that this agricultural implement 20 is only an example, and that the various aspects of the disclosure may be incorporated into other agricultural implements 20 of the same or different type. As such, the disclosure should not be limited by the illustrated examples described below. By way of example, an agricultural implement 20 in the form of a tillage machine is illustrated in FIG. 1. As an example, the agricultural implement 20 may be a mulch finisher, a field cultivator or any type of vertical tillage machine. A direction of travel T is the direction that the agricultural implement 20 is towed or otherwise moves during operation, and a centerline C of the agricultural implement 20 extends in the direction of travel T to define left and right lateral sides.

The agricultural implement 20 may have a main or center frame section 22 centered on the centerline C in the direction of travel T of the agricultural implement 20. The agricultural implement 20 may have one or more wing frame sections 24, 26 hinged to one or more sides of the main or center frame section 22. The wing frame section(s) 24, 26 and the main or center frame section 22 may each have multiple gangs of tools 28 (e.g., rotating disks) thereon for working the ground G. Each inner wing frame section 24 is hinged to the main or center frame section 22 by a pair of identical front and rear hinge assemblies 30, 30' (although one or three or more hinge assemblies may be used for implements with suitable fore-aft dimensions). Outer wing frame sections 26 are hinged to the respective inner wing frame sections 24 by a pair of identical front and rear hinge assemblies 32, 32' (although, again, one or three or more hinge assemblies may be used for implements with suitable fore-aft dimensions). Generally, the disclosed hinge assembly 32, 32' (and agricultural implements 20 in which they are incorporated) couple together inner and outer wing frame sections 24, 26 to provide for multiple pivot points that cooperate to provide a first center of rotation during flex working states that allows the outer wing frame section 26 to float and a second center of rotation during folding that allows the outer wing frame section 26 to be folded over the inner wing frame section 24 into a stowed or transport state. In the working states, the agricultural implement 20 is being pulled along the ground G, such as during a tillage application. The disclosed double hinge configuration provides advantages in both states (e.g., consistent spacing, better tool clearance during down flexing and better loading handling during the working states, while allowing for the outer wing frame sections 26 to fully retract on top of the inner wing frame sections 24 when stowed), while reducing complexity, component count and hinge assembly size.

The agricultural implement 20 is shown having five frame sections. Progressing from left to right in FIGS. 1 and 2, the agricultural implement 20 includes a first (or left) outer wing frame section 26, a first (or left) inner wing frame section 24, a main or center frame section 22, a second (or right) inner wing frame section 24, and a second (or right) outer wing frame section 26. The inner wing frame sections are substantially identical mirror images of one another, as are the outer wing frame sections, and therefore, for simplicity, the inner wing frame sections are referred to herein with the same reference number, as are the outer wing frame sections. Also for simplicity, at times, only one set of inner and outer wing frame sections may be discussed, and it will be understood that the discussion applies to the other set of wing frame sections. Further, at times only a single hinge assembly 30 or 32 may be referred to in the following discussion, and it be understood that the discussion applies to the front and rear hinge assemblies 30, 30' or 32, 32' at both the left side and the right side of the agricultural implement 20, as shown in FIG. 1.

Figure 2:
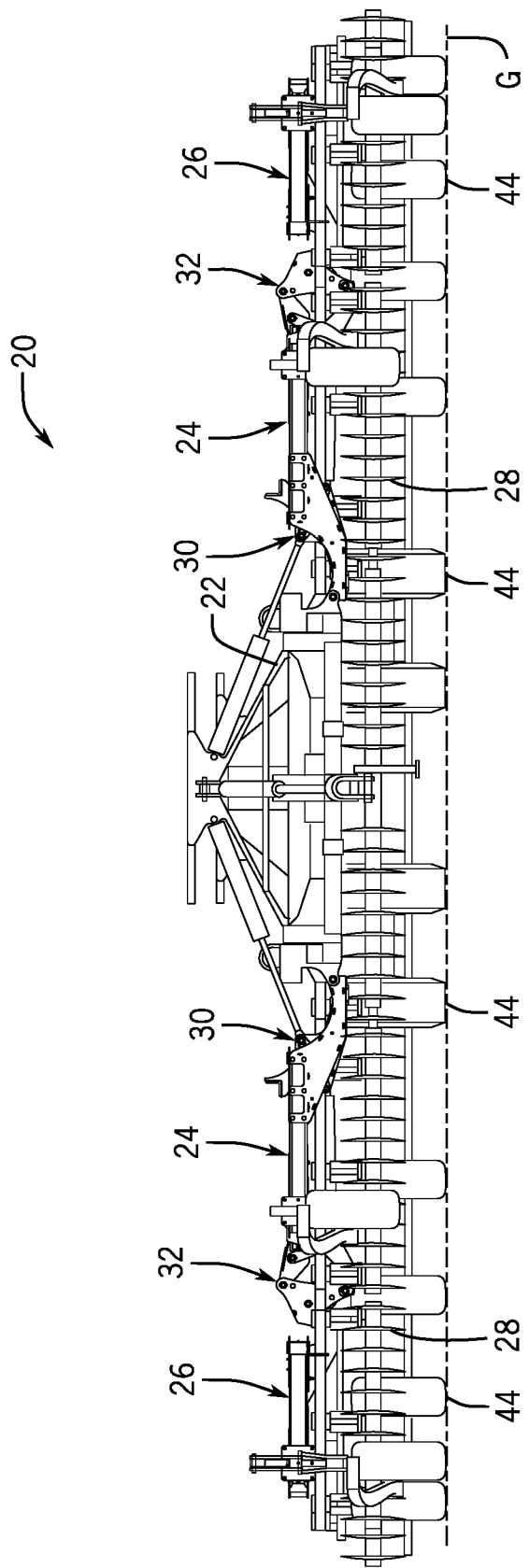
FIG. 2 is a plan view of the agricultural implement of FIG. 1 in a fully extended working state.
Figure 2A:
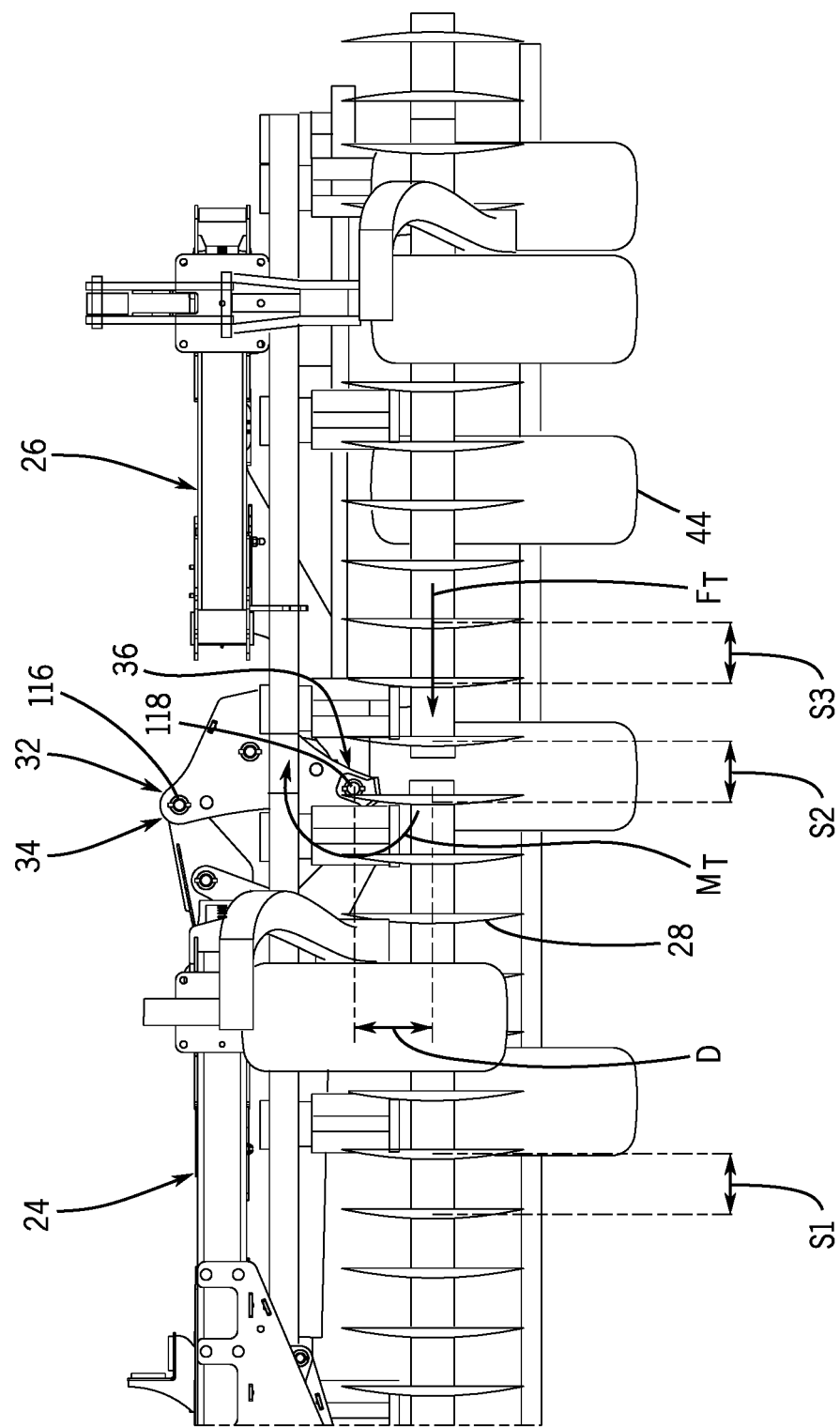
FIG. 2A is an enlarged partial plan views of the agricultural implement of FIG. 1 in the fully extended working state.
Figure 3:
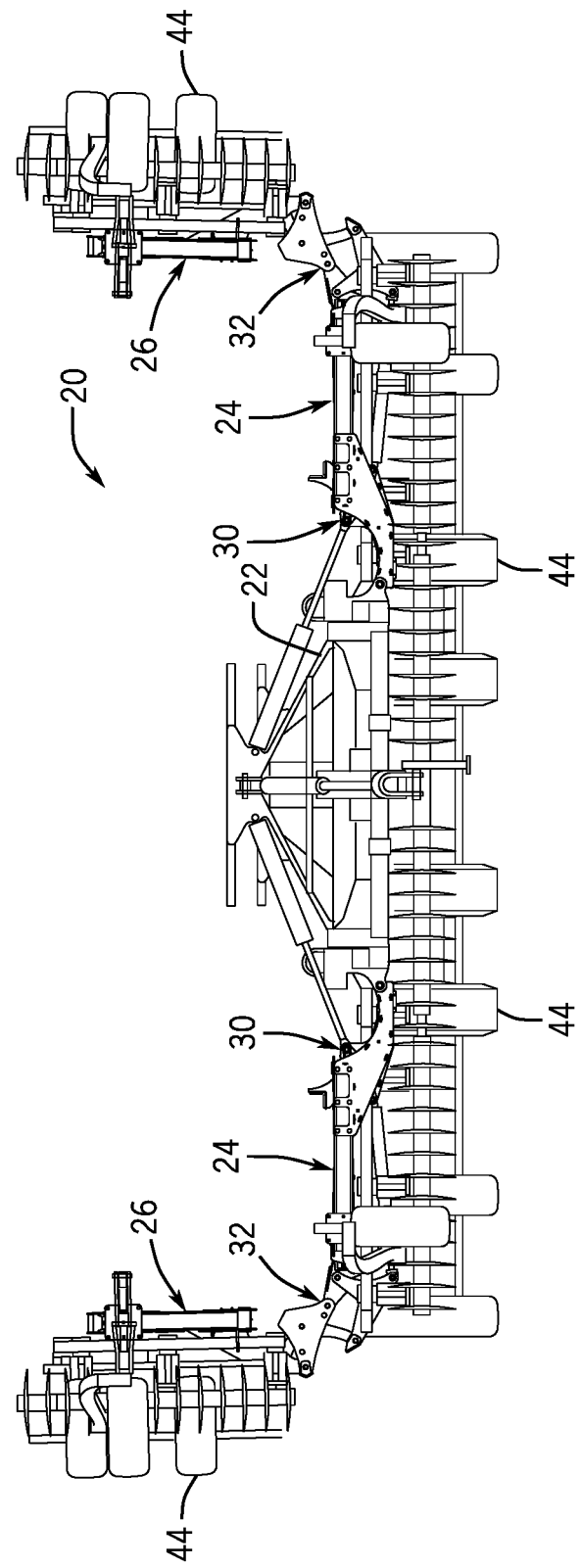
FIGS. 3-5 are plan views of the agricultural implement of FIG. 1 in a various states, including an over-center state of outer wing frame sections shown in FIG. 3, a folded state in which the outer wing frame sections are folded over inner wing frame sections shown in FIG. 4, and a stowed or transport state shown in FIG. 5.
Figure 4:
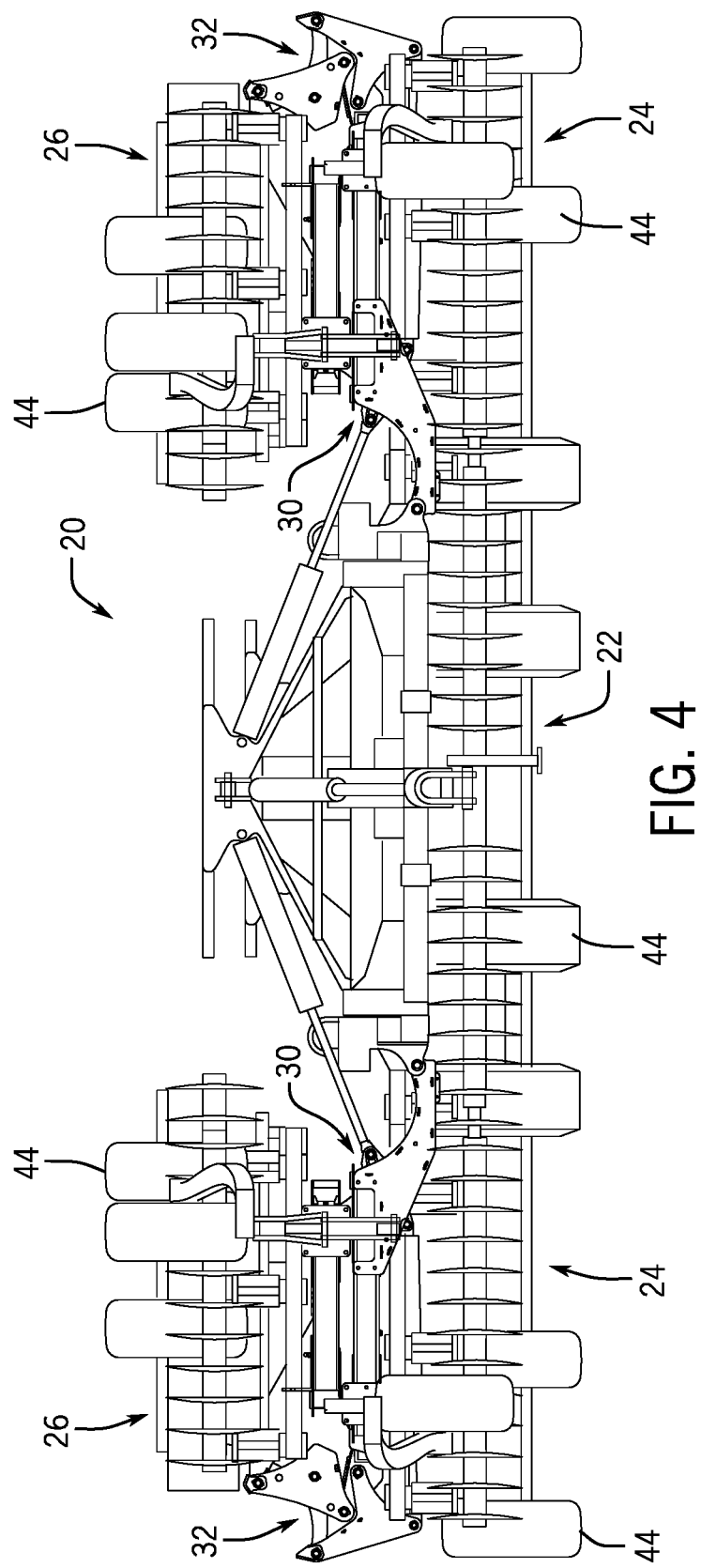
Figure 5:
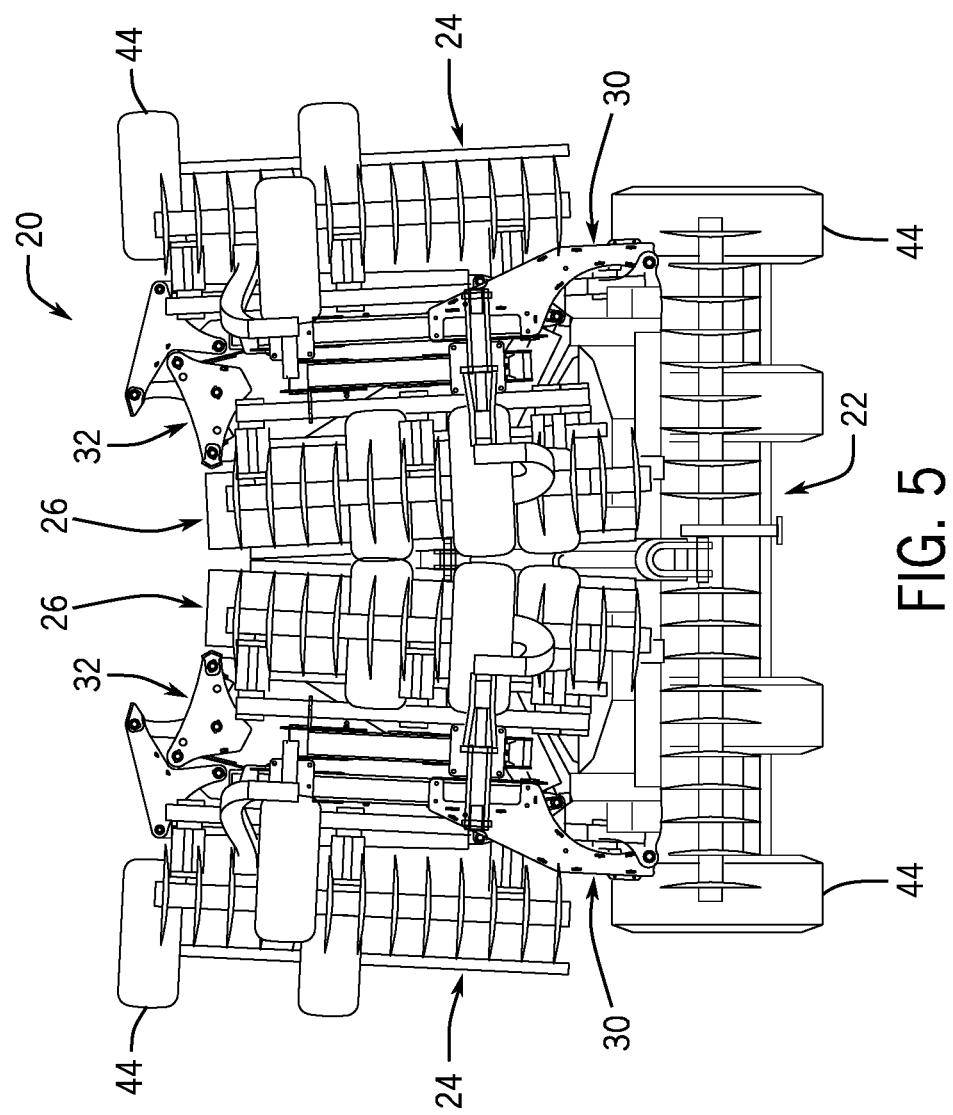
Figure 6:
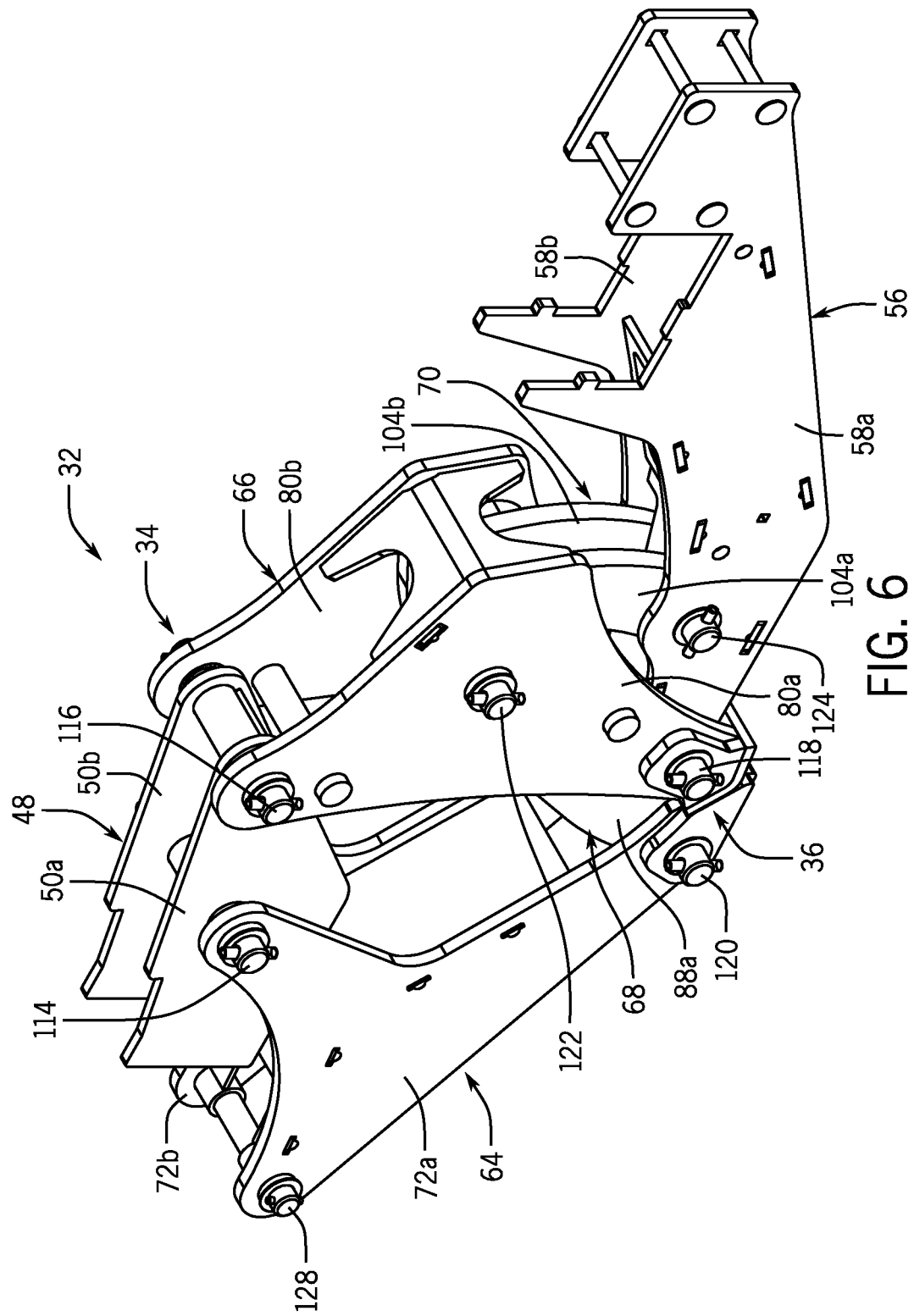
FIG. 6 is a perspective view of an example hinge assembly that may be incorporated into the agricultural implement of FIG. 1.
Figure 7:
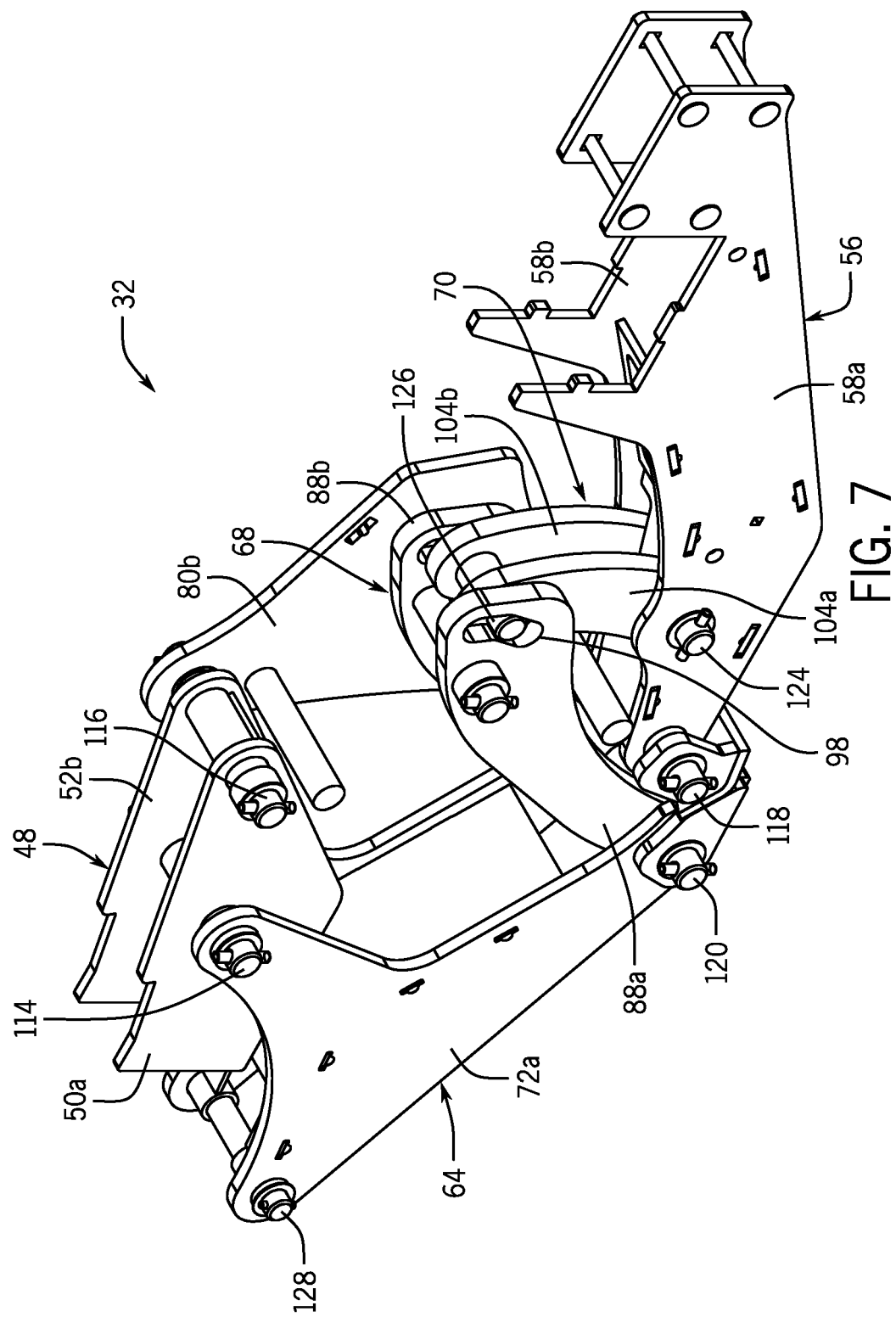
FIG. 7 is a perspective view of the hinge assembly of FIG. 6 shown with a plate removed for clarity.

The inner wing frame sections 24 are hinged at opposing lateral sides of the main or center frame section 22 at by the pair of front and rear hinge assemblies 30, 30' that may pivot with respect thereto. The outer wing frame sections 26 are hinged at the laterally outer sides of the inner wing frame sections 24, respectively, by the pair of front and rear hinge assemblies 32, 32'. For each hinge assembly 32, 32' the outer wing frame section 26 can pivot relative to the inner wing frame section 24 about a fold pivot location 34 and about a flex pivot location 36. The hinge lines which form the fold pivot location 34 and the flex pivot location 36 extend substantially parallel to the fore-aft axis. Such a multi-section hinged design enables the agricultural implement 20 to transition from the fully extended working state, such as shown in FIGS. 1, 2, 2A, 14 and 15A in which the agricultural implement 20 is operational to work the ground G, to an over-center state such as shown in FIGS. 3, 15D and 16, to a folded state such as shown in FIGS. 4, 15F, to a laterally compact, stowed state to facilitate transport on roadways, such as shown in FIG. 5. Further, the hinge assembly 32, 32' enables the working states to include various pivotal orientations in which the outer wing frame section 26 is pivoted or "flexed" upwardly and downwardly to follow the contours of the ground G, for example, as in an upwardly flexed working state shown in FIG. 17 and a downwardly flexed working state shown in FIGS. 18A and 18B.

The agricultural implement 20 includes left and right rear hinge assemblies 30' between the inner wing frame sections 24 and the main or center frame section 22, as well as left and right rear hinge assemblies 32'. The hinge assemblies 30', 32' are spaced apart from the associated hinge assembly 30, 32 along the fore-aft axis such that the hinge assemblies 30, 32 are near the front of the agricultural implement 20 and the hinge assemblies 30', 32' are near the rear of the agricultural implement 20.

The inner and outer wing frame sections 24, 26 each have a number of frame members, such as hollow metal or non-metal tubes or beams (e.g., 2×6 or 2×8 beams, or pairs of 2×2 beams). The frame members may be interconnected to provide a lattice-like framework to which an array of tools 28 may be mounted. In the examples, the inner and outer wing frame sections 24, 26 include both laterally-spaced fore-aft frame members 38 and fore-aft spaced lateral frame members 40, which are bolted, welded or otherwise interconnected in the manner illustrated. The inner and outer wing frame sections 24, 26 may assume various other forms and may have other constructions in other embodiments, provided that the inner and outer wing frame sections 24, 26 enable the tools 28 to be mounted at selected locations across the agricultural implement 20. The agricultural implement 20 may also include various other components mounted to the frame sections 22, 24, 26 at selected locations to facilitate towing of the agricultural implement 20, to automate movement of the agricultural implement 20 between the working and stowed states, or to provide other functions. Such components may include a tow hitch 42 projecting from the main or center frame section 22 in a forward direction, a number of ground-engaging wheels 44 (only a few of which are labeled in the figures for clarity), various secondary tillage tools (e.g., harrows, rakes, finishing baskets and so on), and an actuation system 46 for transitioning the agricultural implement 20 between the fully extended working state (FIGS. 1 and 2) and the stowed state (FIG. 5) for transport.

As noted, the agricultural implement 20 is equipped with a plurality of tools 28 for working the soil, such as the rotating disks (only a few of which are labeled in the figures for clarity). The tools 28 may be mounted to the frame sections 22, 24, 26 as gangs in a strategically-chosen spatial formation or array, with each tool 28 mounted at a particular location dictated by a prescribed placement pattern. Such a prescribed placement pattern may be determined based upon any number of design parameters and other factors, such as a desired furrow row spacing.

In FIGS. 14, 15A-15F and 16, the inner wing frame section 24 and outer wing frame section 26 are only partially depicted. At each hinge assembly 32, 32', the inner wing frame section 24 has an inner wing mounting bracket 48 extending from the fore-aft frame member 38 which faces the outer wing frame section 26. Each inner wing mounting bracket 48 is formed of a pair of parallel flanges 50a, 50b, each of which has a first opening 52 provided therethrough at an outer end thereof (outer being defined with respect to the centerline C of the agricultural implement 20 when in the working states) and a second opening 54 provided therethrough and which is spaced from the first opening 52, see FIG. 8. The first opening 52 may be provided vertically higher than the second opening 54 when the agricultural implement 20 in the working states. The first openings 52 in the flanges 50a, 50b align with each other, and the second openings 54 in the flanges 50a, 50b align with each other. At each hinge assembly 32, 32', the outer wing frame section 26 has an outer wing mounting bracket 56 extending from the fore-aft frame member 38 which faces the inner wing frame section 24. Each outer wing mounting bracket 56 is formed of a pair of parallel flanges 58a, 58b, each of which has a first opening 60 provided therethrough at an inner end thereof (inner being defined with respect to the centerline C of the agricultural implement 20 when in the working states) and a second opening 62 provided therethrough and which is spaced from the first opening 60, see FIG. 9. The second opening 62 is provided vertically higher than the first opening 60 when the agricultural implement 20 is in the working states. The first openings 60 align with each other, and the second openings 62 align with each other.

As noted above, for ease of explanation, hinge assembly 32 is described, with the understanding that hinge assembly 32' is identically formed and functions in the same manner.

Figure 17:
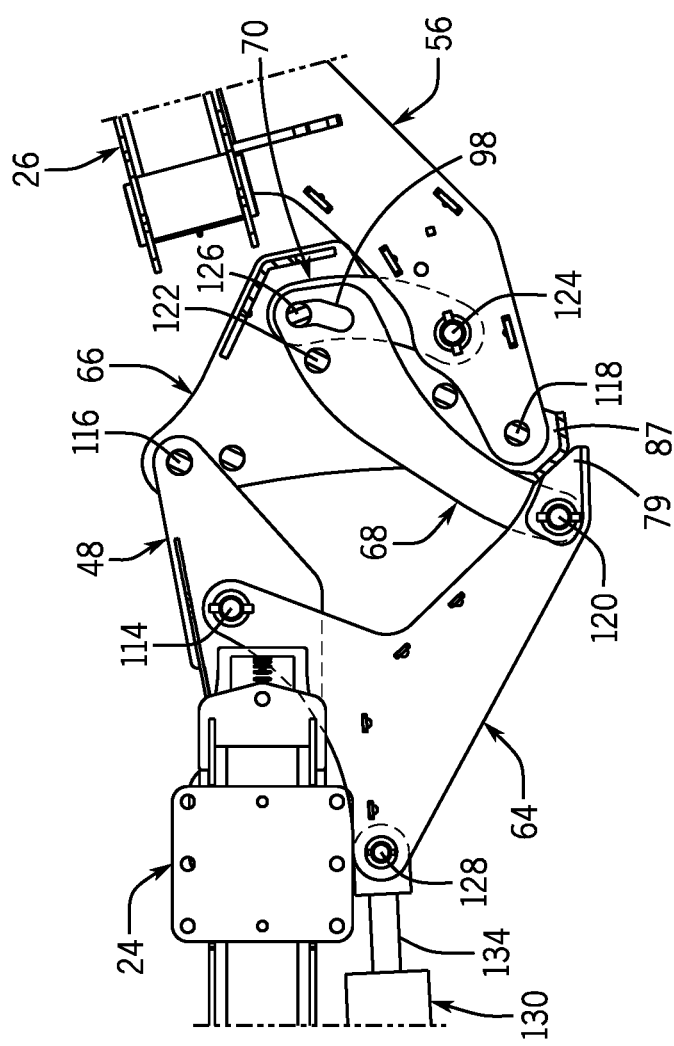
FIG. 17 is a partial front plan view of the agricultural implement of FIG. 1 in an upwardly flexed working state.
Figure 18A:
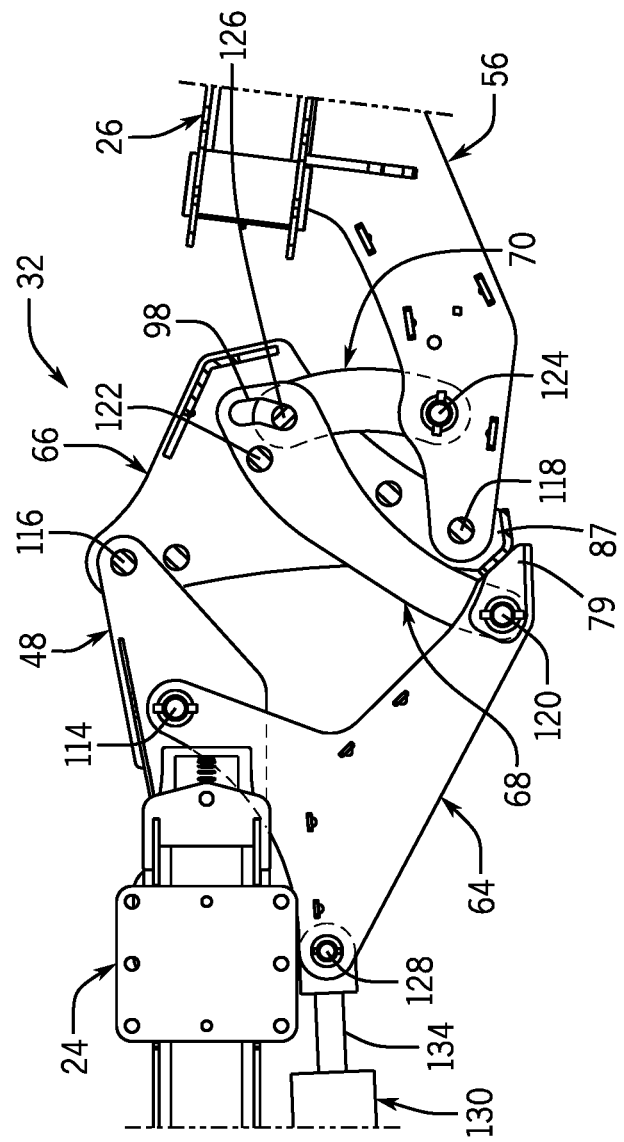
FIGS. 18A and 18B are partial front plan views of the agricultural implement of FIG. 1 in a downwardly flexed working state.
Figure 18B:
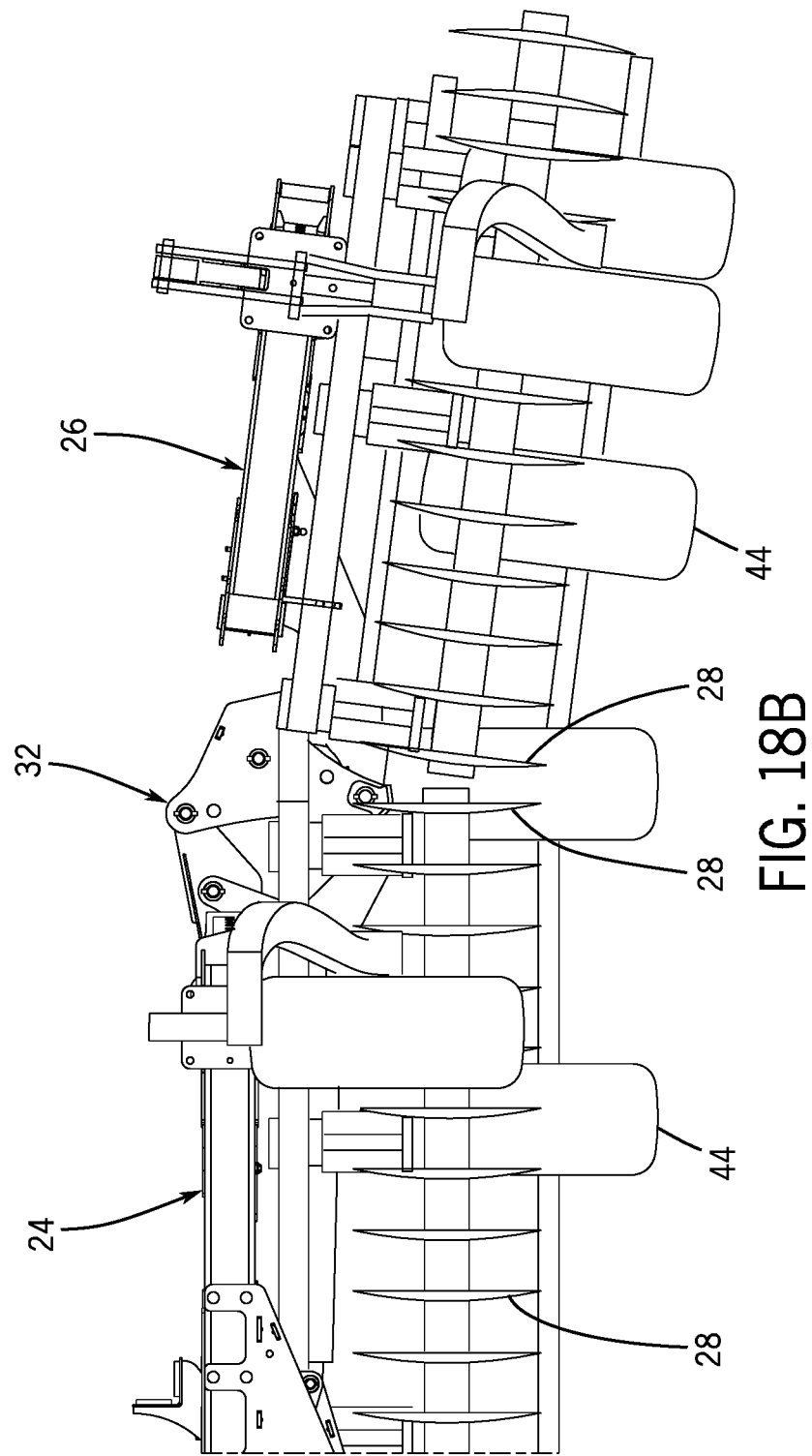

The hinge assembly 32 includes an inner pivot bracket 64 pivotally coupled to the inner wing frame section 24 at the inner wing mounting bracket 48 at the fold pivot location 34, an outer pivot bracket 66 pivotally coupled to the inner pivot bracket 64 and pivotally coupled to the outer wing frame section 26 at the outer wing mounting bracket 56 at a flex pivot location 36, an inner pivot link 68 pivotally coupled to the inner pivot bracket 64 and to the outer pivot bracket 66, and an outer pivot link 70 pivotally coupled to the outer pivot bracket 66 and the outer wing mounting bracket 56. In the specific embodiment shown, the outer pivot link 70 is pivotally connected to the inner pivot link 68 which is, in turn, pivotally coupled to the outer pivot bracket 66. The inner pivot link 68 and the outer pivot link 70 permit relative pivoting of the inner wing frame section 24 and the outer wing frame section 26 between the fully extended working state such as shown in FIG. 2 and the folded state such as shown in FIG. 4 at the fold pivot location 34 and between the fully extended working state such as shown in FIG. 2 and the flexed working states, such as the upwardly flexed working state as shown in FIG. 17 and the downwardly flexed working state as shown in FIGS. 18A and 18B, at the flex pivot location 36. As can be seen, the fold pivot location 34 is vertically higher than the flex pivot location 36 when in the working states.

Each inner pivot bracket 64 is formed of a pair of parallel plates 72a, 72b. The plates 72a, 72b are generally identical, and each includes three openings 74, 76, 78 therethrough, see FIG. 10. The openings 74, 76, 78 are spaced apart from each other and fall at corners of an imaginary triangle. In an embodiment, each plate 72a, 72b is generally triangularly shaped and the openings 74, 76, 78 are proximate to the vertices thereof. A mechanical stop flange portion 79 is defined proximate to the opening 76. The first openings 74 align with each other, the second openings 76 align with each other, and the third openings 78 align with each other. In the working states, the opening 74 is vertically higher than the opening 78 which is vertically higher than the opening 76. Spacers may be provided between the plates 72a, 72b to provide rigidity to the inner pivot bracket 64.

Each outer pivot bracket 66 is formed of a pair of parallel plates 80a, 80b. The plates 80a, 80b are generally identical, and each plate 80a, 80b has three openings 82, 84, 86 therethrough, see FIG. 11. The openings 82, 84, 86 are spaced apart from each other and fall at corners of an imaginary triangle. In an embodiment, each plate 80a, 80b is generally triangularly shaped and two of the openings 82, 84 are proximate to the vertices thereof and the third opening 86 is proximate to the center of the plate 80a, 80b. A mechanical stop flange portion 87 is defined proximate to the opening 76. The first openings 82 align with each other, the second openings 84 align with each other, and the third openings 86 align with each other. In the working states, the opening 82 is vertically higher than the opening 86 which is vertically higher than the opening 84. Spacers may be provided between the plates 80a, 80b to provide rigidity to the outer pivot bracket 66.

Each inner pivot link 68 is formed of a pair of elongated parallel plates 88a, 88b. The plates 88a, 88b are generally identical, and each plate 88a, 88b has a pair of openings therethrough 90, 92, see FIG. 12. In each plate 88a, 88b, the opening 90 is proximate to a lower end 94 thereof when in the working states and the opening 92 is proximate to, but spaced from, an upper end 96 thereof when in the working states. An elongated slot 98 is provided through each plate 88a, 88b and is between the opening 92 and the end 96. The slot 98 has a first end 100 and a second end 102 and the slot 98 may be curved along a radius line therebetween. The first openings 90 align with each other, the second openings 92 align with each other, and the slots 98 align with each other such that the first ends 100 align with each other and the second ends 102 align with each other. The opening 92 aligns with a center point of the slot 98 between the ends 100, 102. When in the working states, the second end 102 of the slot 98 is vertically higher than the first end 100 of the slot 98, and the opening 92 and the slot 98 are vertically higher than the opening 90. Spacers may be provided between the plates 88a, 88b to provide rigidity to the inner pivot link 68. In an embodiment, each plate 88a, 88b is curved from its end 94 to its end 96.

Each outer pivot link 70 is formed of a pair of elongated parallel plates 104a, 104b. The plates 104a, 104b are generally identical, and each plate 104a, 104b has a pair of openings 106, 108 therethrough, see FIG. 13. In each plate 104a, 104b, the opening 106 is proximate to a lower end 110 thereof when in the working states and the opening 108 is proximate to, but spaced from, an upper end 112 thereof when in the working states. The first openings 106 align with each other and the second openings 108 align with each other. When in the working states, the opening 108 is vertically higher than the opening 106. Spacers may be provided between the plates 104a, 104b to provide rigidity to the outer pivot link 70. In an embodiment, each plate 104a, 104b is curved from its end 110 to its end 112.

The flanges 50a, 50b of the inner wing mounting bracket 48 seat between the plates 72a, 72b of the inner pivot bracket 64 and a pivot pin 114 extends through the openings 54, 74 of the inner wing mounting bracket 48 and the inner pivot bracket 64. The pivot pin 114 allows the inner pivot bracket 64 to rotate relative to the inner wing frame section 24.

The flanges 50a, 50b of the inner wing mounting bracket 48 seat between the plates 80a, 80b of the outer pivot bracket 66 and a pivot pin 116 extends through the openings 52, 82 of the inner wing mounting bracket 48 and the outer pivot bracket 66. The pivot pin 116 allows the outer pivot bracket 66 to rotate relative to the inner wing frame section 24 and the fold pivot location 34 is defined at pivot pin 116. The outer pivot bracket 66 is thus pivotally coupled to the inner pivot bracket 64 at the fold pivot location 34 via the connection through the inner wing mounting bracket 48.

The flanges 58a, 58b of the outer wing mounting bracket 56 seat between the plates 80a, 80b of the outer pivot bracket 66 and a pivot pin 118 extends through the openings 60, 84 of the outer wing mounting bracket 56 and the outer pivot bracket 66. The pivot pin 118 allows the outer pivot bracket 66 to rotate relative to the outer wing frame section 26 and the flex pivot location 36 is defined at pivot pin 118.

The end 94 of the inner pivot link 68 seats between the plates 72a, 72b of the inner pivot bracket 64 and a pivot pin 120 extends through the openings 76, 90 of the inner pivot bracket 64 and the inner pivot link 68. The inner pivot bracket 64 and the inner pivot link 68 can pivot relative to each other around the pivot pin 120 which forms a link pivot location. The end 96 of the inner pivot link 68 seats between the plates 80a, 80b of the outer pivot bracket 66 and a pivot pin 122 extends through the openings 86, 92 of the outer pivot bracket 66 and the inner pivot link 68. The outer pivot bracket 66 and the inner pivot link 68 can pivot relative to each other around the pivot pin 122 which forms a link pivot location.

The end 110 of the outer pivot link 70 seats between the flanges 58a, 58b of the outer wing mounting bracket 56 and a pivot pin 124 extends through the openings 62, 106 in the outer wing mounting bracket 56 and the outer pivot link 70. The pivot pin 124 allows the outer pivot link 70 to rotate relative to the outer wing frame section 26. The end 112 of the outer pivot link 70 seats between the plates 88a, 88b of the inner pivot link 68 and a pin 126 extends through the openings 108 in the outer pivot link 70 and through the slots 98 in the inner pivot link 68. The pin 126 and slots 98 allow the outer pivot link 70 to rotate and translate relative to the inner pivot link 68. The outer pivot link 70 is pivotally coupled to the outer pivot bracket 66 via the connection through the inner pivot link 68. In one or more alternate embodiments, the slot 98 may be provided in the outer pivot link 70 and the openings 108 may be provided in the inner pivot link 68. A pivot pin 128 extends through the openings 78 of the plates 72a, 72b of the inner pivot bracket 64.

When the agricultural implement 20 is in the fully extended working state on level ground G, the inner wing frame section 24 is substantially parallel with the outer wing frame section 26. In this fully extended working state, the fold pivot location 34 defined by pivot pin 116 is vertically higher than the outer wing frame section 26 and the flex pivot location 36 defined by pivot pin 118 is vertically lower than the inner wing frame section 24.

In the illustrated example, each hinge assembly 30, 30', 32, 32' is powered by an actuator to fold and unfold the inner wing frame sections 24 and the outer wing frame sections 26 between the fully extended working state (FIGS. 2, 14 and 15) and the stowed state (FIG. 5). The actuators maybe suitable hydraulic piston-cylinder components that are part of and are powered by a hydraulic system onboard the towing vehicle (e.g., agricultural tractor (not shown)) for the agricultural implement 20. With respect to the hinge assembly 32, an actuator 130 is pivotally coupled to each inner pivot bracket 64 at the pivot pin 128 and pivotally coupled to the inner wing frame section 24 at pivot pin 132 and forms part of the actuation system 46. When in the working states, during folding from the fully extended working state to the folded state, and in the folded state, the actuator 130 extends at least in part, vertically below the inner wing mounting bracket 48 of the inner wing frame section 24 and the actuator 130 is coupled to the inner pivot bracket 64 at a location vertically intermediate the fold pivot location 34 and the flex pivot location 36 at pivot pin 128. The actuator 130 may be formed by a rod 134 that is partially housed in a cylinder 136. In an embodiment, the rod 134 is extended or retracted by adjusting fluid pressure in the cylinder 136, via various hydraulic fluid carrying plumbing lines connected to a hydraulic pump 146 of the actuation system 46 on board the towing vehicle. The actuator 130 may be a dual-acting cylinder that may be actuated to extend and retract. The rod 134 may have an actuator coupling member at a distal end that is coupled to the pivot pin 128 of the inner pivot bracket 64.

The hinge assembly 32 provides for flat folding of the outer wing frame section 26 relative to the inner wing frame section 24. The transition from the fully extended working state shown in FIG. 2 to the folded state shown in FIG. 4 is shown in FIGS. 14 and 15A-15F. The rod 134 of the actuator 130 is extended to initiate the folding of the outer wing frame section 26 relative to the inner wing frame section 24. When the actuator 130 is actuated, the outer wing frame section 26 is pivotable with respect to the inner wing frame section 24 at the fold pivot location 34 to be positioned directly above the inner wing frame section 24, which in the illustrated example requires a pivot angle of about 180 degrees. In various embodiments, the full flat-folding angle may be more or less than 180 degrees, in part depending on the configuration of the wing frame sections 24, 26.

As shown in FIG. 15A, the actuator 130 is actuated to extend the rod 134 outwardly from the cylinder 136 to move the outer wing frame section 26. This causes the following to occur: the inner pivot bracket 64 rotates around pivot pin 114 (in a counterclockwise direction), the inner pivot link 68 rotates around the pivot pin 120 (in a counterclockwise direction), the outer pivot bracket 66 rotates around the pivot pin 116 (in a counterclockwise direction), the outer pivot link 70 rotates around the pivot pin 124 (in a counterclockwise direction), and the outer wing mounting bracket 56 rotates around the pivot pin 118 (in a counterclockwise direction). The pin 126 moves from the center of the slot 98 to engage the end 100 of the slot 98. As a result, the stop flange 87 of the outer pivot bracket 66 moves away from the stop flange 79 of the inner pivot bracket 64. At the beginning of this movement, the actuation of the hinge 32 imparts translation movement to the outer wing frame section 26. At this stage, the wheels 44 may still be in contact with the ground G and slide laterally outwardly away from the main or center frame section 22 until the pin 126 engages with the end 100 of the slot 98.

Figure 15B:
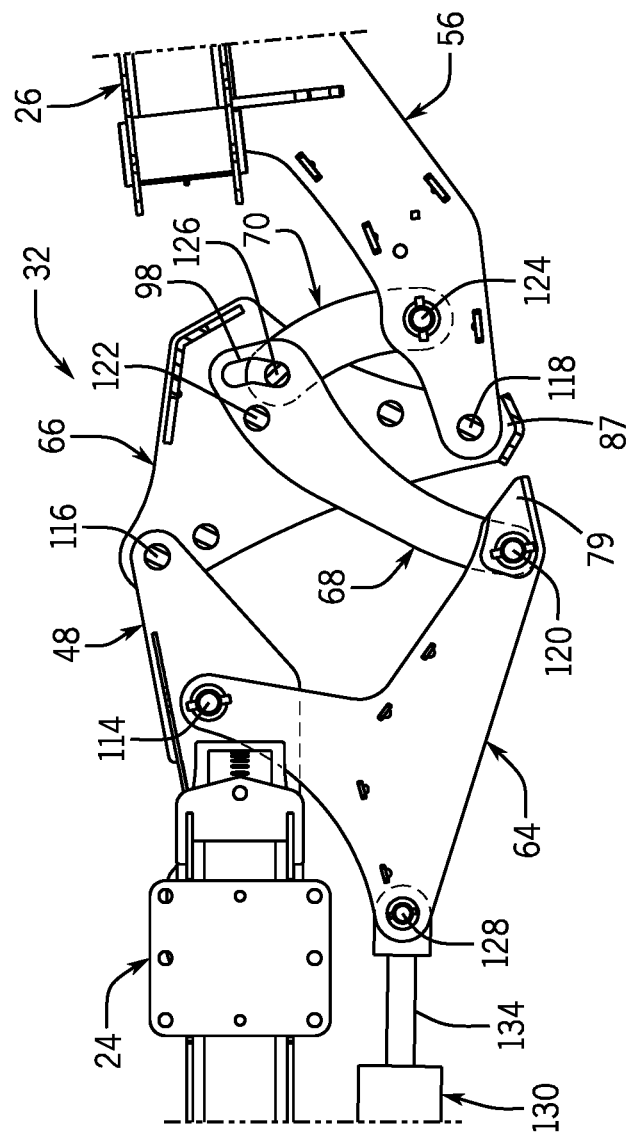
Figure 15C:
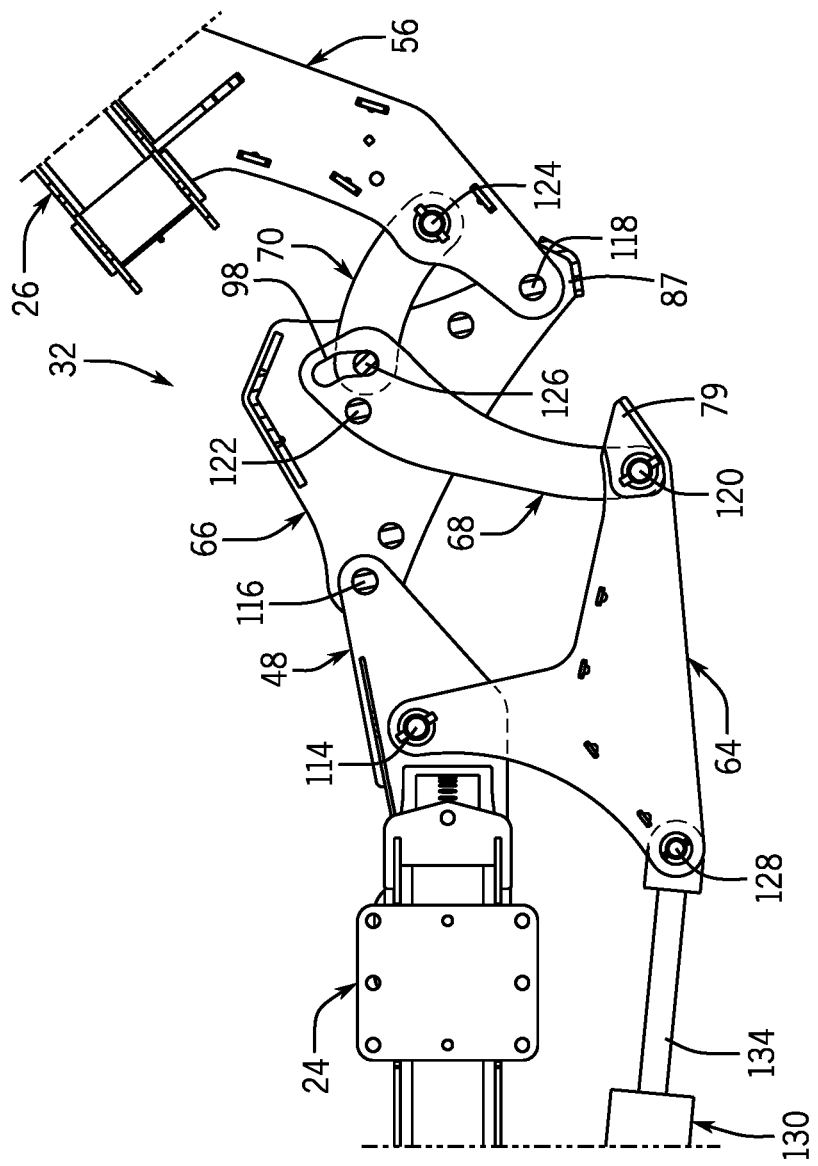
Figure 15D:
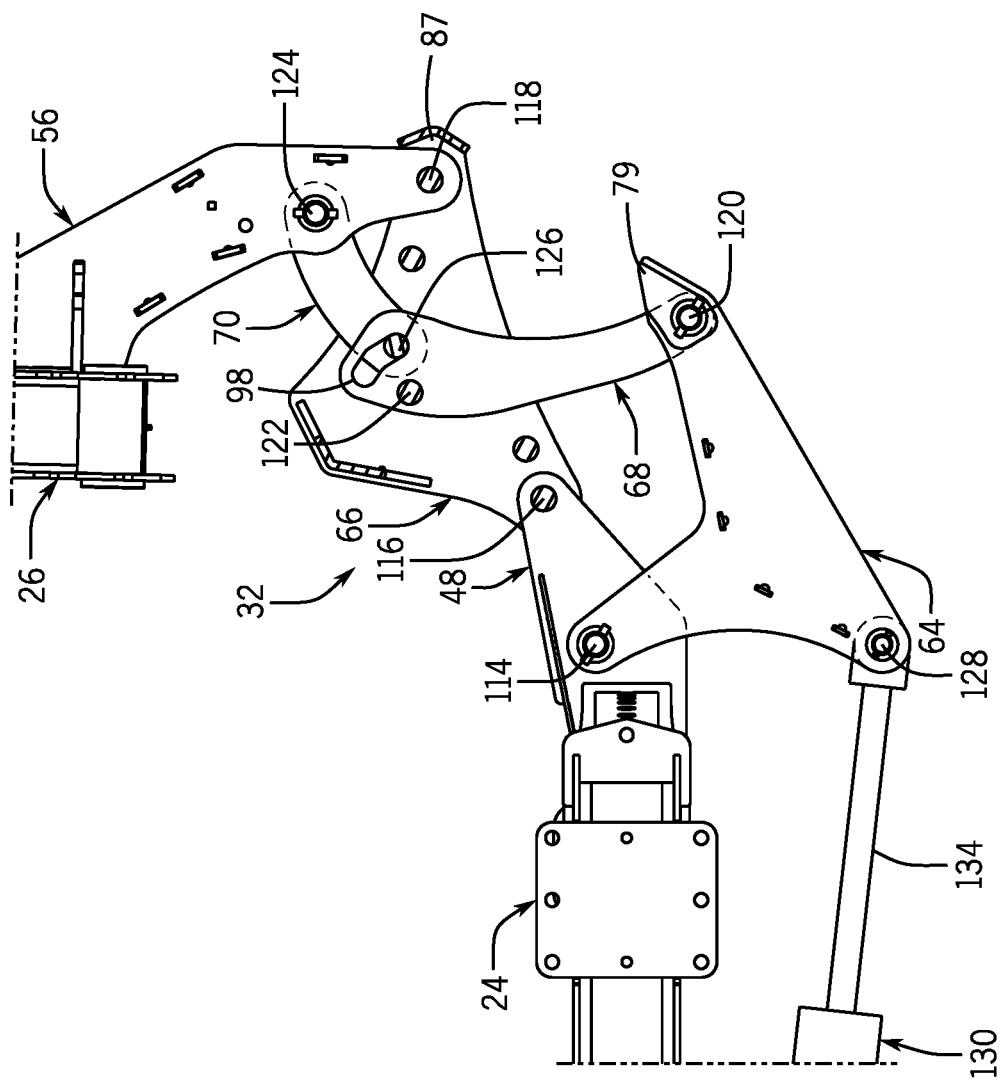
Figure 16:
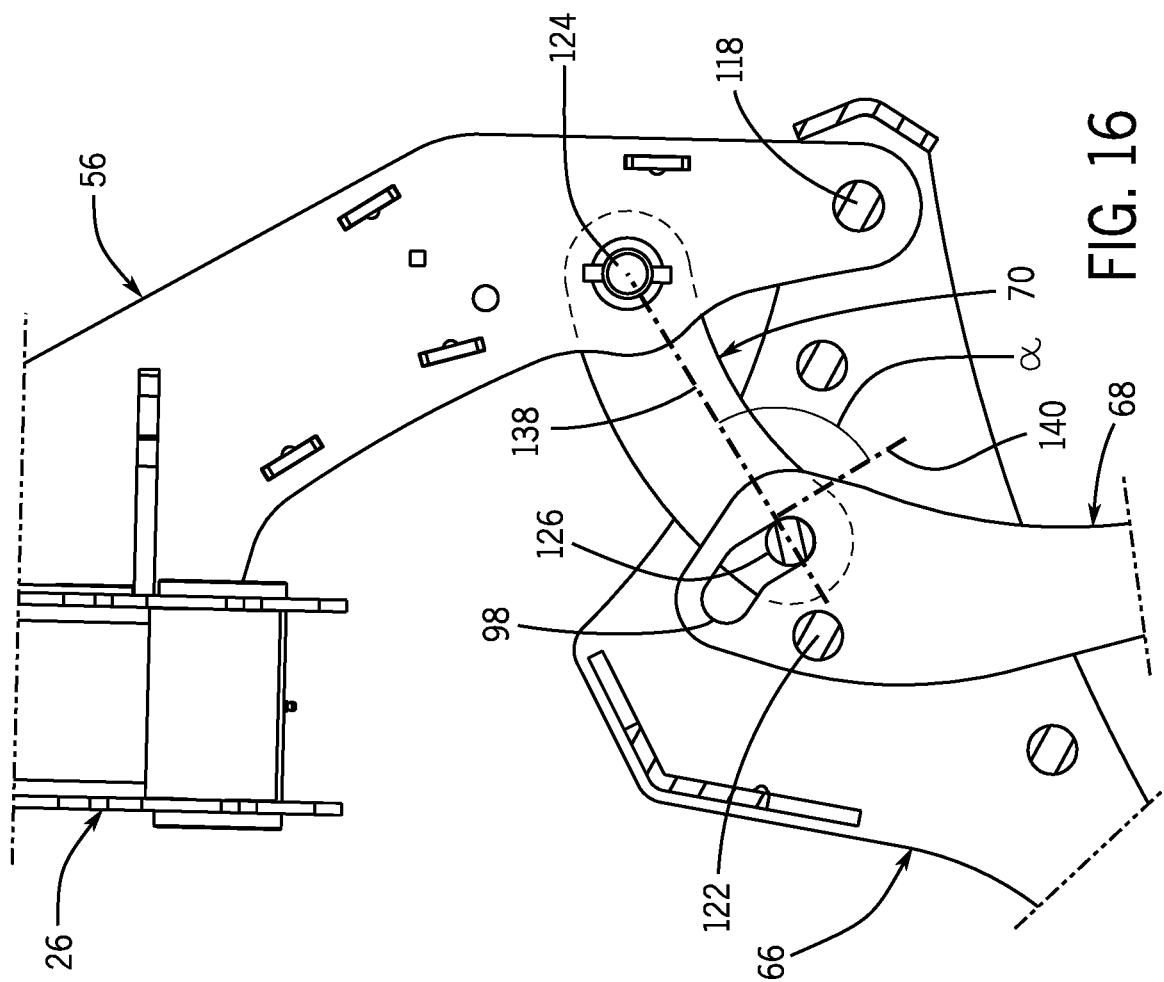
FIG. 16 is an enlarged partial cross-section views of the hinge assembly and portions of the inner and outer wing frame sections shown in the over-center state.

In FIGS. 15B and 15C, the actuator 130 is further actuated to extend the rod 134 outwardly from the cylinder 136 to further fold the outer wing frame section 26. During this movement, the following occurs: the actuator 130 rotates (in a clockwise direction) around pivot pin 132, the inner pivot bracket 64 rotates around the pivot pin 128 and continues to rotate around the pivot pin 114 (in the counterclockwise direction), the inner pivot link 68 continues to rotate around the pivot pin 120 (in the counterclockwise direction), the outer pivot bracket 66 continues to rotate around the pivot pin 116 (in the counterclockwise direction), and the wheels 44 are lifted from the ground G. The outer pivot link 70 and the outer wing mounting bracket 56 remain in the same position relative to outer pivot bracket 66, as shown in FIG. 15A. At this position, the pin 126 remains engaged with the end 100 of the slot 98 as a result of gravity. As a result, the stop flange 87 of the outer pivot bracket 66 moves further away from the stop flange 79 of the inner pivot bracket 64. The inner wing mounting bracket 48 and the outer wing mounting bracket 56 move from an angle relative to each other from about 0 degrees to approaching 90 degrees as shown by the included angle between the inner and outer wing frame sections 24, 26 on a topside thereof. During this movement toward 90 degrees, at a predetermined angular position, the flex pivot location 36 defined by pivot pin 118 is vertically higher than the inner wing frame section 24, and at a predetermined angular position, the flex pivot location 36 defined by pivot pin 118 is vertically higher than the fold pivot location 34 defined by pivot pin 116. Again, these relative vertical positions hold at least when the agricultural implement 20 is on level ground G.

FIG. 15D shows the outer wing frame section 26 approaching vertical when the rod 134 is further extended. This state shows an over-center state of the outer wing frame section 26 at an angle of rotation about the fold pivot location 34 defined at pivot pin 116. In this position, the pin 126 remains engaged with the end 100 of the slot 98 since the inner pivot link 68 and the outer pivot link 70 are oriented with a reference axis 138 of the outer pivot link 70 substantially perpendicular to a centerline 140 of the slot 98, see angle α in FIG. 16. This configuration effectively locks the outer pivot link 70 to the inner pivot link 68 with the pivot pin 126 at the end 100 of the slot 98, which allows the hinge 32 to support the outer wing frame section 26 as the outer wing frame section 26 begins to tip over center (that is the transition from being in tension to being in compression, such as the outer wing frame section 26 passes vertical). Supporting the outer wing frame section 26 in this way reduces or eliminates freefall of the outer wing frame section 26, which could otherwise impart shock loads on the hinge 32, wing frame sections 24, 26 and/or the tools 28. During the approach to vertical, the actuator 130 rotates (in a clockwise direction) around the pivot pin 132, the inner pivot bracket 64 rotates around pivot pin 128 and continues to rotate around the pivot pin 114 (in the counterclockwise direction), the inner pivot link 68 continues to rotate around the pivot pin 120 (in the counterclockwise direction), and the outer pivot bracket 66 continues to rotate around the pivot pin 116 (in the counterclockwise direction). The outer pivot link 70 and the outer wing mounting bracket 56 may remain in the same position relative to the outer pivot bracket 66, as shown in FIG. 15B. In this over-center state, the flex pivot location 36 defined by pivot pin 118 is vertically higher than the inner wing frame section 24 and the fold pivot location 34 defined by pivot pin 116. As a result, the stop flange 87 of the outer pivot bracket 66 moves further away from the stop flange 79 of the inner pivot bracket 64.

Figure 15E:
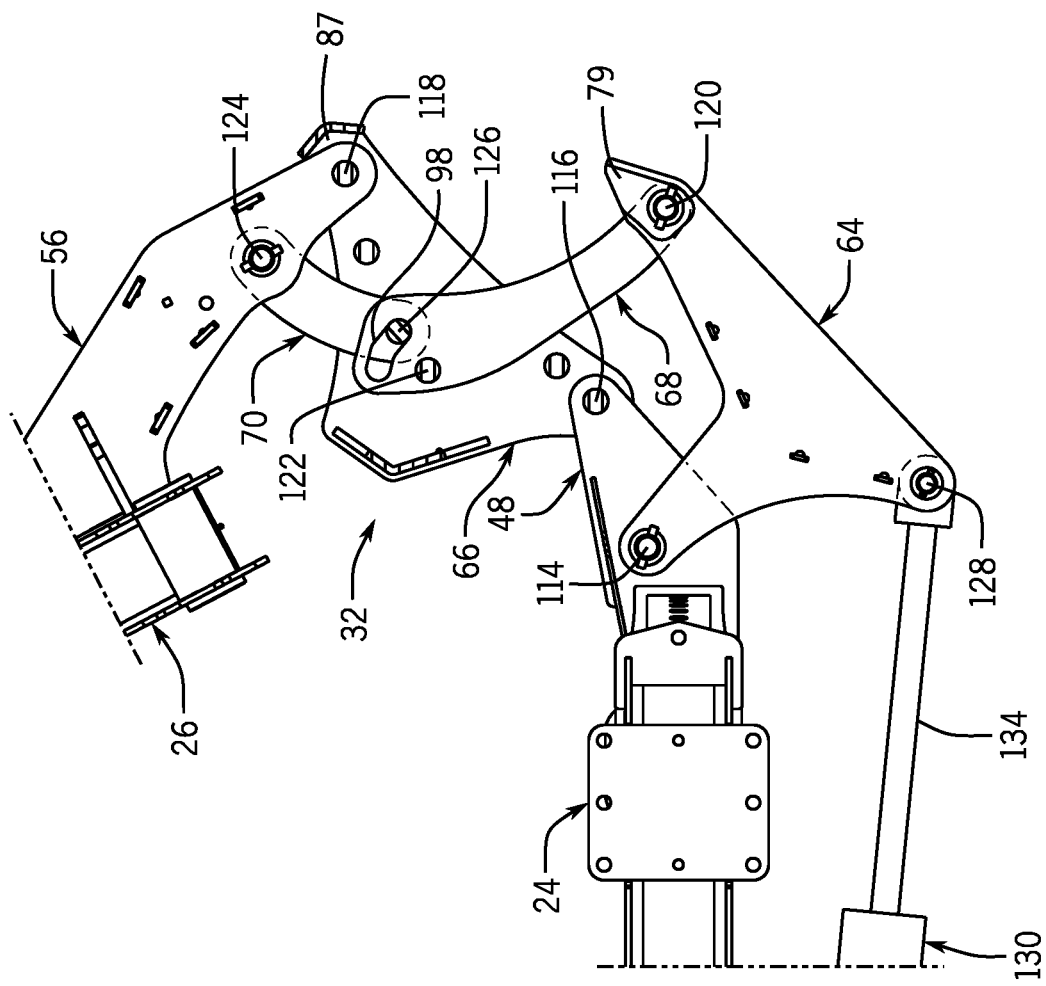
Figure 15F:
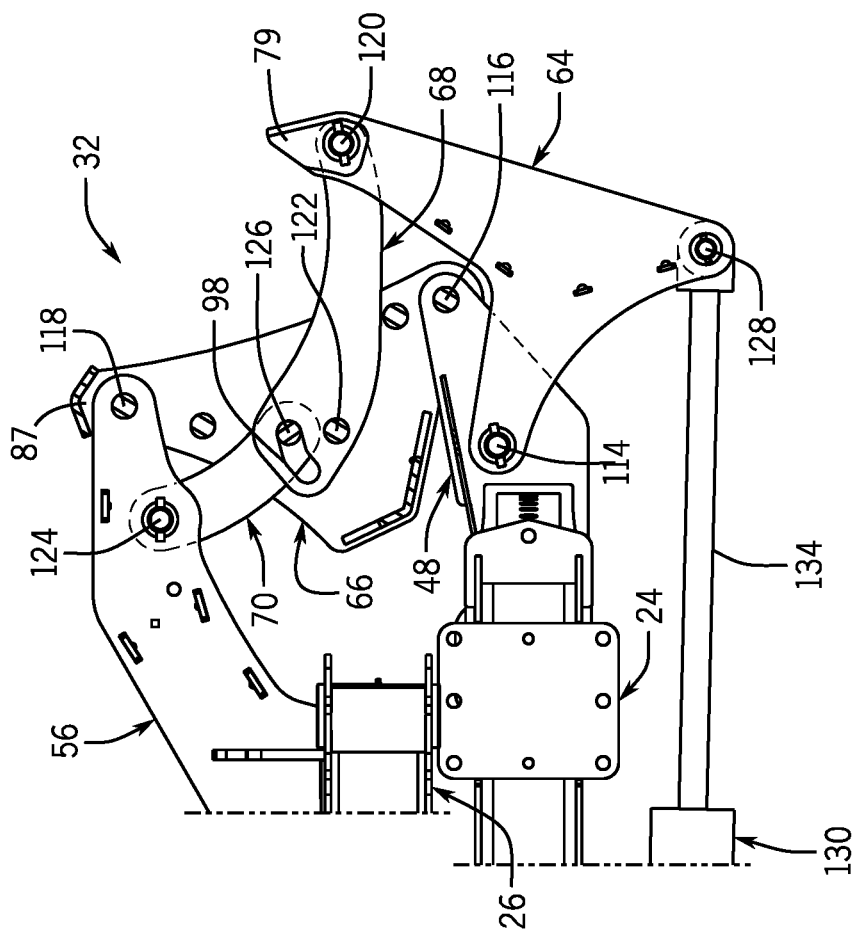

In FIG. 15E, the actuator 130 is further actuated to extend the rod 134 outwardly from the cylinder 136 to further fold the outer wing frame section 26 as it moves past the vertical position. During this movement, the following occurs: the inner pivot bracket 64 continues to rotate around the pivot pin 114 (in the counterclockwise direction), the inner pivot link 68 continues to rotate around the pivot pin 120 (in the counterclockwise direction), the outer pivot bracket 66 continues to rotate around the pivot pin 116 (in the counterclockwise direction), the outer pivot link 70 rotates around the pivot pin 124 (in the counterclockwise direction), and the outer wing mounting bracket 56 rotates around the pivot pin 118 (in the counterclockwise direction). At this partially folded state shown in FIG. 15E, the pin 126 remains engaged with the end 100 of the slot 98 which aids in a controlled fold of the outer wing frame section (without freefall of the outer wing frame section 26), since the inner pivot link 68 and the outer pivot link 70 are still oriented with the reference axis 138 of the outer pivot link 70 substantially perpendicular to the centerline 140 of the slot 98, angle α is near or greater than 90 degrees. In this yet further partially folded state, undersides of the inner wing mounting bracket 48 and the outer wing mounting bracket 56 are angled relative to each other between approximately 90 degrees and 180 degrees.

In FIG. 15F, the actuator 130 is actuated to fully extend the rod 134 outwardly from the cylinder 136 to move the outer wing frame section 26 to the folded state shown in FIG. 4. During this movement, the following occurs: the actuator 130 rotates (in a counter clockwise direction) around the pivot pin 132, the inner pivot bracket 64 rotates around the pivot pin 128 and continues to rotate around pivot pin 114 (in the counterclockwise direction), the inner pivot link 68 continues to rotate around the pivot pin 120 (in the counterclockwise direction), the outer pivot bracket 66 continues to rotate around the pivot pin 116 (in the counterclockwise direction), the outer pivot link 70 rotates around the pivot pin 124 (in the counterclockwise direction), and the outer wing mounting bracket 56 continues to rotate around the pivot pin 118 (in the counterclockwise direction). At this folded state, the pin 126 remains engaged with the end 100 of the slot 98 for a controlled fold of the outer wing frame section without freefall, since the inner pivot link 68 and the outer pivot link 70 are still oriented with the reference axis 138 of the outer pivot link 70 and the centerline 140 of the slot 98 such that angle α is near or greater than 90 degrees. The stop flange 87 of the outer pivot bracket 66 is at its further distance away from the stop flange 79 of the inner pivot bracket 64. In this folded state, the inner wing mounting bracket 48 and thus the outer wing frame section 26 and the outer wing mounting bracket 56 and thus the inner wing frame section 24 are parallel to each other. In this folded state, the actuator 130 remains underneath the inner wring frame section 24, thereby reducing the folded dimension.

With the outer wing frame section 26 folded on top of the inner wing frame section 24, the actuation system can pivot both wing frame sections 24, 26 about the hinge assemblies 30, 30' so that they are also on top of the main or center frame section 22 so that the agricultural implement 20 takes the stowed state shown in FIG. 5 for storage or transport. Further, to unfold the wing frame sections 24, 26 from the main or center frame section 22, and especially the outer wing frame section 26 from the inner wing frame section 24, the foregoing process is reversed.

The hinge assemblies 32, 32' are not mechanically tied together other than by the coupling to the wing frame sections 24, 26. Since there is not a separate physical link or tie member connecting the hinge assemblies 32, 32', fore-aft flexing or twisting of the wing frame sections 24, 26 during operation on each side of the main or center frame section 22, if left unchecked, might cause fluctuations of in the hydraulic system in the fore-aft and lateral directions. As described above, this disclosure provides a system in which the actuators 130, 130' are retracted while agricultural implement 20 is in the working state (fully extended and downwardly or upwardly flexed). Since the rods 134 are not extended or partially extended from their cylinders 136, the actuators 130, 130' are better able to handle torque loads from the outer wing frame section 24. This is further enhanced by isolating and hydraulically locking the actuators 130, 130' for the outer wing frame section 24 from the rest of the system.

Operation of the hinge assembly 32 in the working states will now be described with regard to FIGS. 14, 15A, 17, 18A, 18B for ease in description. In the fully extended working state shown in FIGS. 14 and 15A, the outer wing frame section 26 is generally aligned relative to the inner wing frame section 24, such that the inner wing mounting bracket 48 and the outer wing frame section 26 and the outer wing mounting bracket 56 and the inner wing frame section 24 are parallel to each other. This corresponds to a horizontal position in which the wheels 44 of the outer wing frame section 26 are on terrain that is generally at the same level as the wheels 44 of the inner wing frame section 24. The pin 126 is positioned at generally the center of the slot 98 between the ends 100, 102 thereof. The actuator 130 is not extended, and the stop flange 87 of the outer pivot bracket 66 is in engagement with the stop flange 79 of the inner pivot bracket 64 proximate to the pivot pin 120. The stop flanges 79, 87 cooperate to provide a positive mechanical stop or rotational limiter preventing relative rotational movement of the inner pivot bracket 64 and the outer pivot bracket 66 (and the inner pivot link 68) in the direction of extension (the clockwise direction in FIG. 14).

In FIG. 17, the outer wing frame section 26 is pivoted upward into a furthest most upwardly flexed working state, such as would be the case when the wheels 44 of the outer wing frame section 26 engage terrain at a higher level than the wheels 44 of the inner wing frame section 24. In the upwardly flexed working states, the inner wing mounting bracket 48 and the outer wing mounting bracket 56 are angled relative to each other at an included angle of less than 180 degrees between the topsides of the inner wing frame section 24 and the outer wing frame section. This degree of travel is limited by the amount of travel that the outer wing frame section 26 can travel in the slot 98 as described herein. In the upwardly flexed working states, the hinge assembly 32 allows the outer wing frame section 26 to pivot and float about the pin 126, and to pivot about the pivot pin 118 to translate up and down (e.g., as the outer wing frame section 26 follows the contour of the ground G). During a transition from the fully extended working state of FIGS. 14 and 15A into the upwardly flexed working states, the outer wing frame section 26 pivots (e.g., in a counterclockwise direction in FIG. 14) about the pivot pin 118, and the pin 126 slides from the center of the slot 98 toward the end 102 of the slot 98 and also rotates within the slot 98. The travel of the pin 126 within the slot 98 limits the upward extent of floating of the outer wing frame section 26 relative to the inner wing frame section 24 when the pin 126 engages with the end 102 of the slot 98. Since the actuator 130 is not actuated, the stop flange 87 of the outer pivot bracket 66 remains in engagement with the stop flange 79 of the inner pivot bracket 64, such that the inner pivot bracket 64, the outer pivot bracket 66 and the inner pivot link 68 do not pivot relative to one another.

In FIGS. 18A and 18B, the outer wing frame section 26 is pivoted downward into a furthest most downwardly flexed working state, such as would be the case when the wheels 44 of the outer wing frame section 26 engage terrain at a lower level than the wheels 44 of the inner wing frame section 24. In the various downwardly flexed working states, the inner wing mounting bracket 48 and the outer wing mounting bracket 56 are angled relative to each other at an included angle of less than 180 degrees between the undersides of the inner wing frame section 24 and the outer wing frame section. This degree of travel is limited by the amount of travel that the outer wing frame section 26 can travel in the slot 98 as described herein. In the downwardly flexed working states, the hinge assembly 32 allows the outer wing frame section 26 to pivot and float about the pin 126 and to pivot about the pivot pin 118 to translate up and down (e.g., as the outer wing frame section 26 follows the contour of the ground G). During a transition from the fully extended working state of FIGS. 14 and 15A into the downwardly flexed working states, the outer wing frame section 26 pivots (e.g., in a clockwise direction in FIG. 14) about the pivot pin 118, and the pin 126 slides from the center of the slot 98 toward the end 100 of the slot 98 and also rotates within the slot 98. The travel of the pin 126 within the slot 98 limits the downward extent of floating of the outer wing frame section 26 relative to the inner wing frame section 24 when the pin 126 engages with the end 100 of the slot 98. The stop flange 87 of the outer pivot bracket 66 remains in engagement with the stop flange 79 of the inner pivot bracket 64 to prevent rotation of the inner pivot bracket 64, the outer pivot bracket 66 and the inner pivot link 68 during downward flexing of the outer wing frame section 26.

In various embodiments, the outer wing frame section 26 is pivotable with respect to the inner wing frame section 24 at the flex pivot location 36 in each clock direction. In one example, the hinge assembly 32 enables the outer wing frame section 26 to float (or pivot) approximately 10 degrees from the fully extended working state to the lowest downwardly flexed working state and approximately 15 degrees from the fully extended working state to the highest upwardly flexed working state.

As noted above, the tools 28 may be arranged on the agricultural implement 20 in a way tending to cause thrust loads across the hinge assemblies 32, 32' that may affect the flexing of the wing frame sections 24, 26 when working the ground G in a manner that is detrimental to the performance of the agricultural implement 20. Front and rear rows of disk gangs may be arranged in canted or fore-aft angled orientations, such as with the front rows of disk gangs offset with their inner ends forward their outer ends, and the rear rows of disk gangs in the opposite offset orientation with their inner ends rearward of their outer ends. The disks themselves may also or instead be canted within their respective gangs. Arranging the disk gangs in this way may serve to move the soil in different lateral directions at the front and rear rows of disk gangs, for example, to better break up the soil during a tillage operation. The offset disk gangs will thus impart different thrust forces on the wing frame sections 24, 26 and the hinge assemblies 32, 32'. Toed in disks at the front will cause laterally inwardly directed thrust at the front of the agricultural implement 20, and toed out disks at the rear will cause laterally outwardly directed thrust at the rear of the agricultural implement 20. If the front and rear thrust loads are not equal, an overall moment is effected on the hinge assemblies 32, 32'. By reducing the vertical distance between each effective thrust load from the hinge line, the resulting moments on the hinge assemblies 32, 32' can be reduced.

In the illustrated example, the pivot pin 118, which forms the flex pivot location 36, remains below the underside of the inner wing frame section 24, and at least when the agricultural implement 20 is in the working states, and is vertically lower than the pivot pin 116 which forms the fold pivot location 34 such that the flex pivot location 36 is closer to the ground G than the fold pivot location 34 in the working states. This relative positioning of the fold pivot location 34 and the flex pivot location 36 reduces or neutralizes the applied moment created by the gangs of tools 28. FIG. 2A shows the distance D and the force $F_t$ which creates a moment $M_t$ around the flex pivot location 36. The relative positioning of the pivot locations 34, 36 also provides balancing of the inner and outer wing frame sections 24, 26 from the front to the back of the agricultural implement 20 so that the tools 28 may remain firmly grounded during operation without one or more ends of the inner wing frame sections 24 being pushed upwardly relative to the outer wing frame sections 26.

It should also be noted that the vertically offset flex pivot location 36 and fold pivot location 34 provided by the double-jointed hinge assembly 32, 32' disclosed herein is beneficial in at least two other ways. First, the hinge assemblies 32, 32' may have a more laterally compact form-factor so that the lateral spacing across the hinge assemblies (between the wing frame sections 24, 26) need not be wider than the desired lateral spacing between the tools 28. This allows for a consistent spacing between the two tools 28 adjacent the hinge assemblies 32, 32' (one from the inner wing frame section 24 and one from the outer wing frame section 26) as between tools 28 on the same gang. As shown in FIG. 2A, spacing S1 which shows the spacing between the tools 28 in the gang on the inner wing frame section 24 is the same as spacing S2 which shows the spacing between tools adjacent to the hinge assembly 32, and which are both the same as S3 which shows the spacing between the tools 28 in the gang on the outer wing frame section 26. Second, by separating and lowering the flex pivot location 36 for the downward flexing relative to the fold hinge point, the radius or arc swung by the gangs of tools 28 during downward flexing is reduced, which improves clearance and reduces the likelihood of the tools 28 contacting or otherwise interfering with one another during downward flexing, even when the outer wing frame section 26 is angled fully downward, see FIG. 18B.

In various embodiments, each actuator 130, 130' of the front and rear hinge assemblies 32, 32' on each side of the main or center frame section 22 may be hydraulically isolated, for example, by one or more check valves in fluid communication therewith which prevents the hydraulic fluid from actuating the actuators 130, 130' when the inner and outer wing frame sections 24, 26 are in the working states. The actuators 130, 130' may be hydraulically isolated individually by a dedicated check valve per actuator (see e.g., FIG. 19) or in front and rear pairs on each side of the main or center frame section 22 by a single check valve per pair (see e.g., FIG. 20). Alternatively, in other embodiments, the actuators 130, 130' may remain in hydraulic communication with each other and/or with the hydraulic pump 146, in which case the pump 146 may be operated continuously or modulated intermittently to supply the actuators 130, 130' with constant or modulated hydraulic pressure while the inner and outer wing frame sections 24, 26 are in the working states. In any of these embodiments, the actuation system may be configured to prevent the actuators 130, 130' from actuating while the inner and outer frame sections 24, 26 are in the working states. Further, in any of these embodiments, the actuation system may be configured so that the actuators 130, 130' are in their retracted states (e.g., with their pistons retracted into their cylinder barrels) while the inner and outer frame sections 24, 26 are in the working states.

Figure 19:
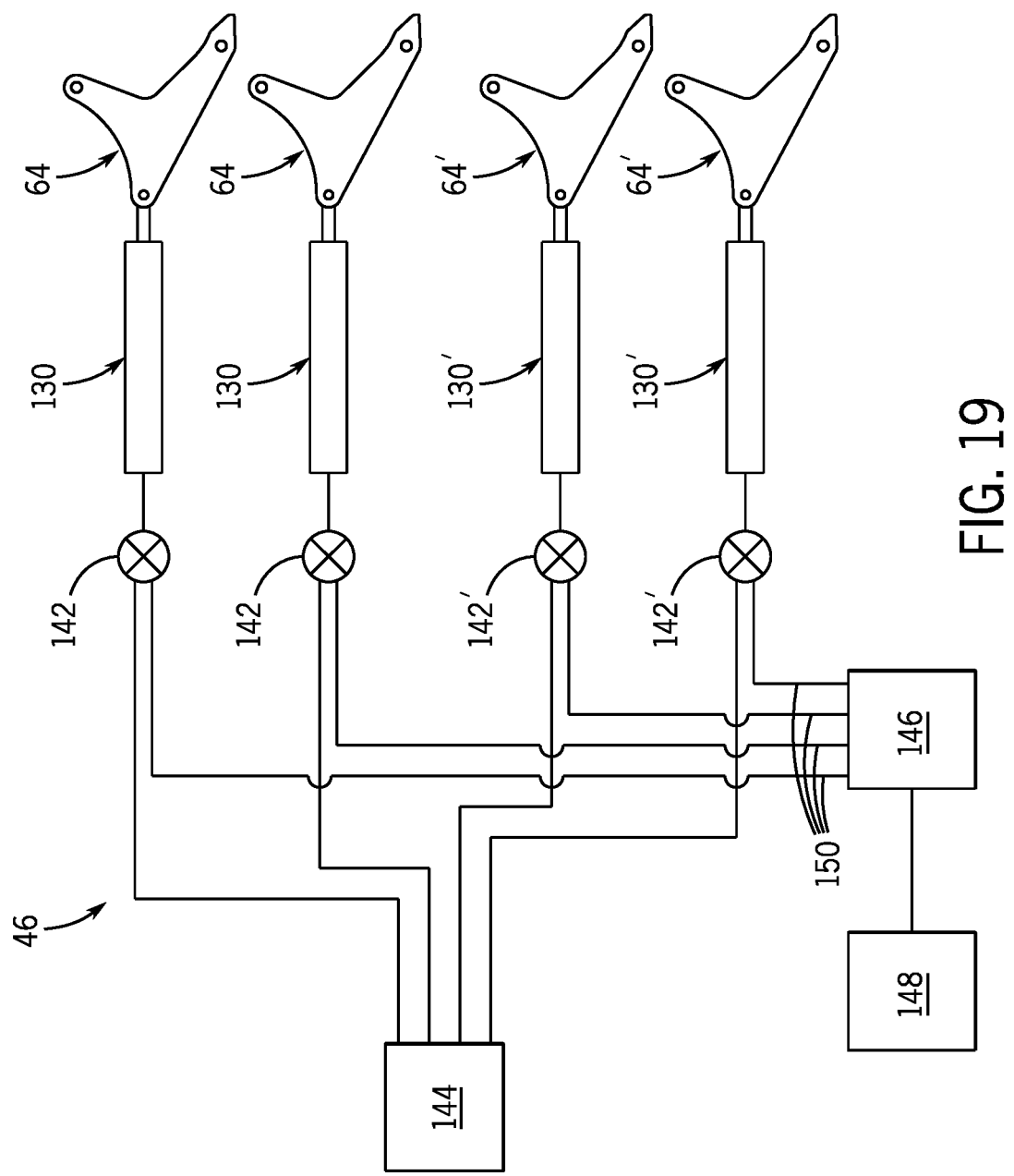
FIG. 19 is a schematic representation of an example actuation system for actuating the hinge assembly of FIG. 6.

FIG. 19 illustrates one example arrangement of the actuation system 46, which includes a controller 144 configured to coordinate functioning between check valves 142, 142' to ensure that the outer wing frame section 26 is folded and unfolded in a coordinated manner without the front and rear actuators 130, 130' working against one another.

The controller 144 may have a processor and memory architecture for controlling the opening and closing of the check valves 142, 142', which may be connected to the controller 144 directly or by a suitable bus. The controller 144 may be configured as a computing device with associated processor devices and memory architectures, as a hardwired computing circuit (or circuits), as a programmable circuit, as a hydraulic, electrical or electro-hydraulic controller, or otherwise. As such, the controller 144 may be configured to execute various control functionality with respect to the agricultural implement 20. In some embodiments, the controller 144 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 144 may be configured as an assembly of hydraulic components (e.g., check valves, flow lines, pistons and cylinders, and so on), such that control of the check valves 142, 142' may be affected with, and based upon, hydraulic, mechanical, or other signals and movements. Further, the agricultural implement 20 includes one or more hydraulic pumps, such as pump 146, which pressurizes the source 148 of fluid. Flow from the pump 146 is routed through the check valves 54 via conduits 150 (e.g., flexible hoses) in order to actuate the actuators 130, 130'. The controller 144 may be in electronic, hydraulic, mechanical, or other communication with the check valves 142, 142' and the pump 146.

When the agricultural implement 20 is in the fully extended working state, the controller 144 may send a signal to the check valves 142, 142', for example, to close, thereby preventing the flow of fluid from the source 148 into the actuators 130, 130' and preventing the actuation of the actuators 130, 130'. This "locks" the actuators 130, 130' to prevent the actuators 130, 130' from actuating and possibly working against each other. When the agricultural implement 20 is the process of transitioning from the fully extended working state to the stowed state or from the stowed state to the fully extended working state, the controller 144 may send a signal to the check valves 142, 142' to open so as to allow fluid to flow therethrough and to allow actuation of the actuators 130, 130'. In various embodiments, the check valves 142, 142' may be electro-hydraulic valves (as depicted) or pilot-actuated hydraulic valves. Electro-hydraulic valves would take controller input for opening and closing. Pilot-actuated hydraulic valves would utilize hydraulic pressure to open, such that the check valves would default to close while the agricultural implement 20 is in the working states and would open by hydraulic pressure during folding from the fully extended working state to the stowed state or during unfolding from the stowed state to the fully extended working state.

Figure 20:
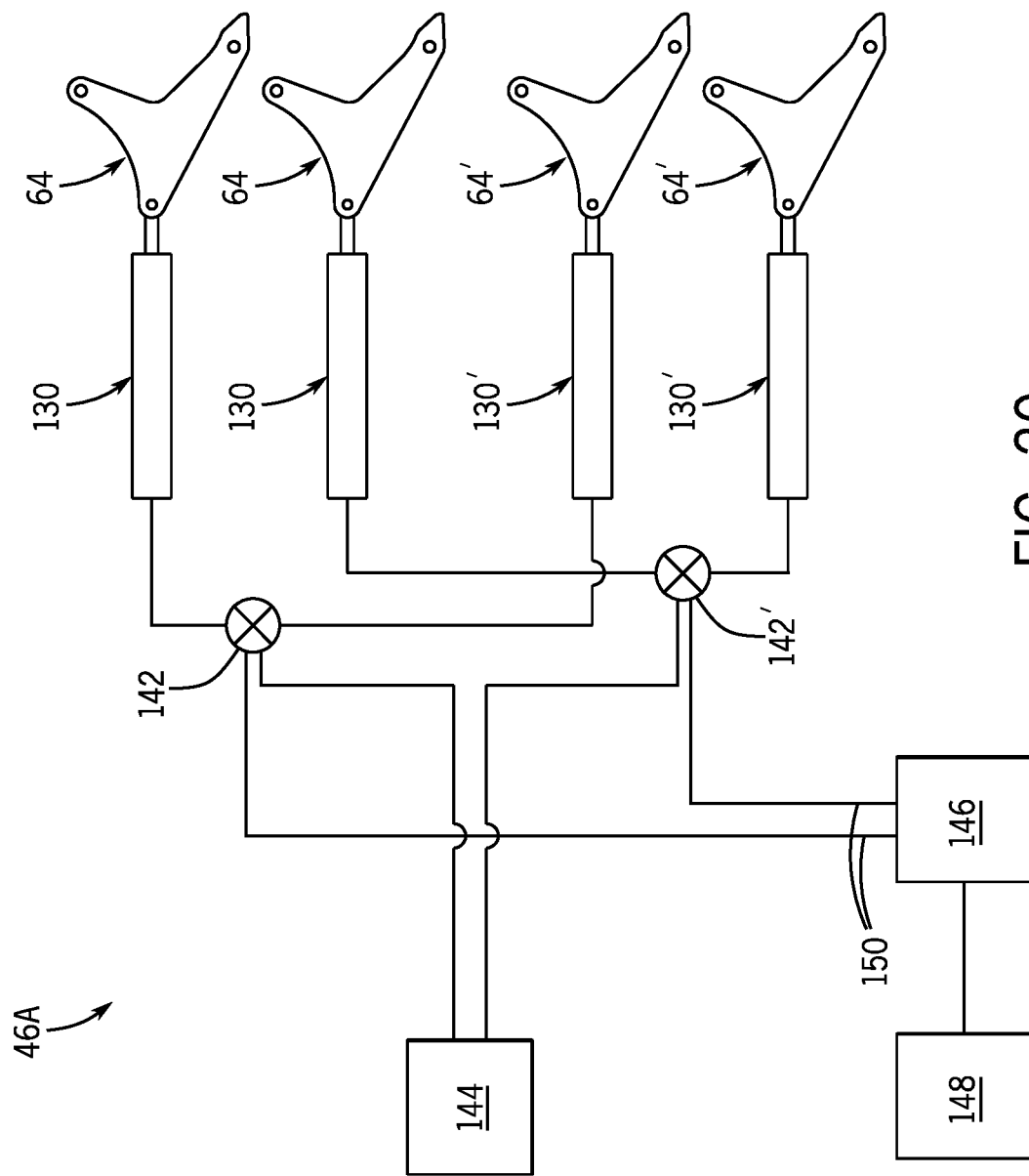
FIG. 20 is a schematic representation of another example actuation system for actuating the hinge assembly of FIG. 6.

FIG. 20 illustrates another example arrangement of the actuation system 46A configured in a manner that allows cooperative or coordinated front and rear actuation of the inner and outer frame sections 24, 26 and inhibits the front and rear actuators 130, 130' of each frame section 24, 26 from working against one another. The actuation system 46A includes similar components as in the preceding example, which are thus numbered the same in FIG. 20. As noted above, rather than having dedicated check valves 142, 142' for each of the actuators 130, 130', the front and rear pairs of actuators 130, 130' on each lateral side of the main or center frame section 22 are tied together hydraulically and isolated as a pair from the rest of the hydraulic system by a single check valve 142, 142'. The actuation system 46A ensures that the front and rear actuators 130, 130' in each pair actuate in parallel simultaneously, and thereby reducing or avoiding the potential for pressure spikes in one of the actuators 130, 130' under asymmetric loading, without the need for precision valving that may otherwise be needed to ensure that the actuators 130, 130' in the pair are synchronized.

As in the actuation system 46 of FIG. 19, the controller 144 of the actuation system 46A may have a processor and memory architecture for controlling the opening and closing of the check valves 142, 142', as described above, and which may be connected to the controller 144 directly or by a suitable bus. The actuation system 46A is part of or connected to a hydraulic circuit with one or more hydraulic pumps, such as pump 146, that pressurizes the source 148 of fluid. Flow from the pump 146 is routed through the check valves 54 via conduits 150 (e.g., flexible hoses) in order to actuate the actuators 130, 130'. The controller 144 may be in electronic, hydraulic, mechanical, or other communication with the check valves 142, 142' and the pump 146. The check valves 142, 142' again may be electro-hydraulic valves (as depicted) or pilot-actuated hydraulic valves. The check valves 142, 142' may have two or three (as depicted) hydraulic ports and may be configured so that each pair of actuators 130, 130' are always in hydraulic communication or so that each actuator in the pair are in hydraulic communication with each other only when the associated check valve is open and otherwise hydraulically isolated from each other when the associated check valve is closed.

When the agricultural implement 20 is in the fully extended working state, the controller 144 may send a signal to the check valves 142, 142', for example, to close, thereby preventing the flow of fluid from the source 148 into the actuators 130, 130' and preventing the actuation of the actuators 130, 130'. This "locks" the actuators 130, 130' to prevent the actuators 130, 130' from actuating and possibly working against each other. When the agricultural implement 20 is in the process of transitioning from the fully extended working state to the stowed state or from the stowed state to the fully extended working state, the controller 144 may send a signal to the check valves 142, 142' to open so as to allow fluid to flow therethrough and to allow actuation of the actuators 130, 130'.

Also, the following examples are provided, which are numbered for easier reference.

1. A hinge assembly for an agricultural implement having an inner wing frame section and an outer wing frame section each having a top side and an underside, the hinge assembly including: an inner pivot bracket pivotally coupled to the inner wing frame section; an outer pivot bracket pivotally coupled to the inner pivot bracket at a fold pivot location and pivotally coupled to the outer wing frame section at a flex pivot location; an inner pivot link pivotally coupled to the inner pivot bracket and the outer pivot bracket; and an outer pivot link pivotally coupled to the outer pivot bracket and the outer wing frame section; wherein the inner pivot bracket and the outer pivot bracket pivot relative to each other at the fold pivot location between a working state and a folded state and the flex pivot location moves relative to the fold pivot location during the relative pivoting of the inner pivot bracket and the outer pivot bracket; and wherein, when in the working state, the fold pivot location is higher than the top side of the inner wing frame section and the flex pivot location is lower than the bottom side of the inner wing frame section.

2. The hinge assembly of example 1, wherein the outer pivot link couples to the outer pivot bracket at a first pivot that permits the outer pivot link to translate with respect to the outer pivot bracket.

3. The hinge assembly of example 2, wherein the inner pivot link includes a slot at the first pivot.

4. The hinge assembly of example 3, wherein at least a portion of the slot extends long a reference axis and the outer pivot link has a centerline; and wherein, at an over-center angle of rotation of the outer wing frame section about the fold pivot location between the working and folded states, the inner pivot link and the outer pivot link are oriented with the centerline of the outer pivot link substantially perpendicular to the reference axis of the slot.

5. The hinge assembly of example 1, wherein the outer pivot bracket has a bracket opening at the fold pivot location and the inner pivot bracket has a bracket opening at a link pivot location at which the inner pivot link couples to the inner pivot bracket.

6. The hinge assembly of example 5, further comprising an actuator pivotally coupled to the inner pivot bracket.

7. The hinge assembly of example 1, wherein, when in the working state, the inner wing frame section is substantially parallel with the outer wing frame section or at a downward or upwardly angled orientation with respect to the outer wing frame section.

8. The hinge assembly of example 7, wherein, when in the folded state, the fold pivot location is higher than the top side of the inner wing frame section and the flex pivot location is higher than the top side of the inner wing frame section.

9. The hinge assembly of example 8, further including: an actuator mounted below the bottom side of the inner wing frame section and pivotally coupled to the inner wing frame section and the inner pivot bracket at a location intermediate the fold pivot location and the flex pivot location.

10. The hinge assembly of example 1, further including: an inner mounting bracket fixedly attached to the inner wing frame section; and an outer mounting bracket fixedly attached to the outer wing frame section; wherein the inner mounting bracket, at least in part, defines the fold pivot location and the outer mounting bracket, at least in part, defines the flex pivot location.

11. The hinge assembly of example 1, wherein the outer wing frame section is pivotable with respect to the inner wing frame section at the fold pivot location about 180 degrees; and wherein the outer wing frame section is pivotable with respect to the inner wing frame section at the flex pivot location about 15 degrees in each clock direction.

12. An agricultural implement including: an inner wing frame section having a top side and a bottom side; an outer wing frame section having a top side and a bottom side; and a hinge assembly pivotally coupling the inner wing frame section and the outer wing frame section, the hinge assembly including: an inner pivot bracket pivotally coupled to the inner wing frame section; an outer pivot bracket pivotally coupled to the inner pivot bracket at a fold location and pivotally coupled to the outer wing frame section at a flex pivot location; an inner pivot link pivotally coupled to the inner pivot bracket and the outer pivot bracket; and an outer pivot link pivotally coupled to the outer pivot bracket and the outer wing frame section; wherein the inner pivot bracket and the outer pivot bracket pivot relative to each other at the fold pivot location between a working state and a folded state and the flex pivot location moves relative to the fold pivot location during the relative pivoting of the inner pivot bracket and the outer pivot bracket; and wherein, when in the working state, the fold pivot location is higher than the top side of the inner wing frame section and the flex pivot location is lower than the bottom side of the inner wing frame section.

13. The agricultural implement of example 12, wherein, when in the working state, the inner wing frame section is substantially parallel with the outer wing frame section or at a downward or upwardly angled orientation with respect to the outer wing frame section; and wherein, when in the folded stated, the fold pivot location is higher than the top side of the inner wing frame section and the flex pivot location is higher than the top side of the inner wing frame section when in the folded state.

14. The agricultural implement of example 12, further including an actuator mounted below the bottom side of the inner wing frame section and pivotally coupled to the inner wing frame section and the inner pivot bracket at a location intermediate the fold pivot location and the flex pivot location.

15. The agricultural implement of example 12, further including a second hinge assembly spaced apart from the hinge assembly along a fore-aft axis, the second hinge assembly including: a second inner pivot bracket pivotally coupled to the inner wing frame section at a second fold pivot location; a second outer pivot bracket pivotally coupled to the outer wing frame section at a second flex pivot location and coupled to the second inner pivot bracket; a second set of first and outer pivot links pivotally coupled to the inner pivot bracket and the outer pivot bracket and to the outer pivot bracket and the outer wing frame section, respectively; wherein the hinge assembly and the second hinge assembly are actuated by separate hydraulic cylinders having pistons that are in a retracted position when the outer wing frame section is in the working state.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A hinge assembly for an agricultural implement having an inner wing frame section and an outer wing frame section each having a top side and an underside, the hinge assembly comprising:
an inner pivot bracket pivotally coupled to the inner wing frame section;
an outer pivot bracket pivotally coupled to the inner pivot bracket at a fold pivot location and pivotally coupled to the outer wing frame section at a flex pivot location;
an inner pivot link pivotally coupled to the inner pivot bracket and the outer pivot bracket; and
an outer pivot link pivotally coupled to the outer pivot bracket and the outer wing frame section;

wherein the inner pivot bracket and the outer pivot bracket pivot relative to each other at the fold pivot location between a working state and a folded state and the flex pivot location moves relative to the fold pivot location during the relative pivoting of the inner pivot bracket and the outer pivot bracket; and
wherein, when in the working state, the fold pivot location is higher than the top side of the inner wing frame section and the flex pivot location is lower than the bottom side of the inner wing frame section.

2. The hinge assembly of claim 1, wherein the outer pivot link couples to the outer pivot bracket at a first pivot that permits the outer pivot link to translate with respect to the outer pivot bracket.

3. The hinge assembly of claim 2, wherein the inner pivot link includes a slot at the first pivot.

4. The hinge assembly of claim 3, wherein at least a portion of the slot extends along a reference axis and the outer pivot link has a centerline; and
wherein, at an over-center angle of rotation of the outer wing frame section about the fold pivot location between the working and folded states, the inner pivot link and the outer pivot link are oriented with the centerline of the outer pivot link substantially perpendicular to the reference axis of the slot.

5. The hinge assembly of claim 1, wherein the outer pivot bracket has a bracket opening at the fold pivot location and the inner pivot bracket has a bracket opening at a link pivot location at which the inner pivot link couples to the inner pivot bracket.

6. The hinge assembly of claim 5, further comprising an actuator pivotally coupled to the inner pivot bracket.

7. The hinge assembly of claim 1, wherein, when in the working state, the inner wing frame section is substantially parallel with the outer wing frame section or at a downward or upwardly angled orientation with respect to the outer wing frame section.

8. The hinge assembly of claim 7, wherein, when in the folded state, the fold pivot location is higher than the top side of the inner wing frame section and the flex pivot location is higher than the top side of the inner wing frame section.

9. The hinge assembly of claim 8, further comprising an actuator mounted below the bottom side of the inner wing frame section and pivotally coupled to the inner wing frame section and the inner pivot bracket at a location intermediate the fold pivot location and the flex pivot location.

10. The hinge assembly of claim 1, further comprising:
an inner mounting bracket fixedly attached to the inner wing frame section; and
an outer mounting bracket fixedly attached to the outer wing frame section;
wherein the inner mounting bracket, at least in part, defines the fold pivot location and the outer mounting bracket, at least in part, defines the flex pivot location.

11. The hinge assembly of claim 1, wherein the outer wing frame section is pivotable with respect to the inner wing frame section at the fold pivot location about 180 degrees; and
wherein the outer wing frame section is pivotable with respect to the inner wing frame section at the flex pivot location about 15 degrees in each clock direction.

12. An agricultural implement comprising:
an inner wing frame section having a top side and a bottom side;
an outer wing frame section having a top side and a bottom side; and a hinge assembly pivotally coupling the inner wing frame section and the outer wing frame section, the hinge assembly comprising:
  an inner pivot bracket pivotally coupled to the inner wing frame section;
  an outer pivot bracket pivotally coupled to the inner pivot bracket at a fold location and pivotally coupled to the outer wing frame section at a flex pivot location;
  an inner pivot link pivotally coupled to the inner pivot bracket and the outer pivot bracket; and
  an outer pivot link pivotally coupled to the outer pivot bracket and the outer wing frame section;
  wherein the inner pivot bracket and the outer pivot bracket pivot relative to each other at the fold pivot location between a working state and a folded state and the flex pivot location moves relative to the fold pivot location during the relative pivoting of the inner pivot bracket and the outer pivot bracket; and
  wherein, when in the working state, the fold pivot location is higher than the top side of the inner wing frame section and the flex pivot location is lower than the bottom side of the inner wing frame section.

13. The agricultural implement of claim 12, wherein the outer pivot link couples to the outer pivot bracket at a first pivot that permits the outer pivot link to translate with respect to the outer pivot bracket.

14. The agricultural implement of claim 13, wherein the inner pivot link includes a slot at the first pivot in which at least a portion of the slot extends long a reference axis;
  wherein the outer pivot link has a centerline; and
  wherein at an over-center angle of rotation of the outer wing frame section about the fold pivot location the inner pivot link and the outer pivot link are oriented with the centerline of the outer pivot link substantially perpendicular to the reference axis of the slot.

15. The agricultural implement of claim 12, wherein, when in the working state, the inner wing frame section is substantially parallel with the outer wing frame section or at a downward or upwardly angled orientation with respect to the outer wing frame section.

16. The agricultural implement of claim 12, further comprising an actuator mounted below the bottom side of the inner wing frame section and pivotally coupled to the inner wing frame section and the inner pivot bracket at a location intermediate the fold pivot location and the flex pivot location.

17. The agricultural implement of claim 12, wherein the outer wing frame section is pivotable with respect to the inner wing frame section at the fold pivot location about 180 degrees; and
  wherein the outer wing frame section is pivotable with respect to the inner wing frame section at the flex pivot location about 15 degrees in each clock direction.

18. The agricultural implement of claim 12, further comprising a second hinge assembly spaced apart from the hinge assembly along a fore-aft axis, the second hinge assembly comprising:
  a second inner pivot bracket pivotally coupled to the inner wing frame section at a second fold pivot location;
  a second outer pivot bracket pivotally coupled to the outer wing frame section at a second flex pivot location and coupled to the second inner pivot bracket;
  a second set of first and outer pivot links pivotally coupled to the inner pivot bracket and the outer pivot bracket and to the outer pivot bracket and the outer wing frame section, respectively.

19. The agricultural implement of claim 18, wherein the hinge assembly and the second hinge assembly are actuated by separate hydraulic cylinders having pistons that are in a retracted position when the outer wing frame section is in the working state.

20. The agricultural implement of claim 12, wherein, when in the folded stated, the fold pivot location is higher than the top side of the inner wing frame section and the flex pivot location is higher than the top side of the inner wing frame section when in the folded state.

* * * * *

UNITED STATES PATENT AND TRADEMARK OFFICE
CERTIFICATE OF CORRECTION

PATENT NO.       : 11,206,755 B2
APPLICATION NO.  : 16/406402
DATED            : December 28, 2021
INVENTOR(S)      : Becker et al.

Page 1 of 1

It is certified that error appears in the above-identified patent and that said Letters Patent is hereby corrected as shown below:

In the Claims

In Column 23, Claim 14, Line 30, delete "long" and insert -- along --, therefor.

Signed and Sealed this
Eighth Day of March, 2022

Drew Hirshfeld
*Performing the Functions and Duties of the*
*Under Secretary of Commerce for Intellectual Property and*
*Director of the United States Patent and Trademark Office*